(12) United States Patent
Arai et al.

(10) Patent No.: US 9,286,565 B2
(45) Date of Patent: Mar. 15, 2016

(54) COMPOSITE CONTAINER LID WITH IC TAG

(71) Applicants: TOYO SEIKAN GROUP HOLDINGS, LTD., Tokyo (JP); NIPPON CLOSURES CO., LTD., Tokyo (JP)

(72) Inventors: Toshiyuki Arai, Kanagawa (JP); Takahiro Kurosawa, Kanagawa (JP); Takayuki Kikuchi, Tokyo (JP); Toru Sahara, Kanagawa (JP); Mamiko Sugi, Kanagawa (JP)

(73) Assignees: TOYO SEIKAN GROUP HOLDINGS, LTD., Tokyo (JP); NIPPON CLOSURES CO., LTD., Tokyo (JP)

( * ) Notice: Subject to any disclaimer, the term of this patent is extended or adjusted under 35 U.S.C. 154(b) by 0 days.

(21) Appl. No.: 14/407,713

(22) PCT Filed: Jun. 25, 2013

(86) PCT No.: PCT/JP2013/067303
§ 371 (c)(1),
(2) Date: Dec. 12, 2014

(87) PCT Pub. No.: WO2014/002971
PCT Pub. Date: Jan. 3, 2014

(65) Prior Publication Data
US 2015/0186770 A1     Jul. 2, 2015

(30) Foreign Application Priority Data

Jun. 25, 2012 (JP) ................................ 2012-142193
Jun. 25, 2012 (JP) ................................ 2012-142370
Mar. 27, 2013 (JP) ................................ 2013-067084

(51) Int. Cl.
*G06K 19/06* (2006.01)
*G06K 19/077* (2006.01)
(Continued)

(52) U.S. Cl.
CPC ...... *G06K 19/07798* (2013.01); *B65D 41/3423* (2013.01); *B65D 41/3447* (2013.01); *B65D51/18* (2013.01); *B65D 55/02* (2013.01); *G08B 13/2434* (2013.01); *B65D 2203/10* (2013.01); *B65D 2251/0015* (2013.01); *B65D 2251/0078* (2013.01)

(58) Field of Classification Search
CPC ........... B65D 2203/10; B65D 2101/00; G06K 19/07798
USPC .............................. 235/492; 340/572.1–572.9
See application file for complete search history.

(56) References Cited

U.S. PATENT DOCUMENTS 5,667,085 A     9/1997  Ogden et al.
7,364,089 B2 *  4/2008  Claessens et al. ............ 235/492
(Continued)

FOREIGN PATENT DOCUMENTS

JP       8-511225       11/1996
JP    2005-321935       11/2005
(Continued)

OTHER PUBLICATIONS

Search report from International Patent Appl. No. PCT/JP2013/067303, mail date is Aug. 27, 2013.

*Primary Examiner* — Jamara Franklin
(74) *Attorney, Agent, or Firm* — Greenblum & Bernstein, P.L.C.

(57) ABSTRACT

A composite container lid which includes an inner cap fitted onto the container mouth portion by screw engagement, an over-cap fitted onto the inner cap, and an IC tag. The over-cap has a top panel and a skirt descending from the circumferential edge of the top panel. The inner cap has a top plate and a cylindrical wall descending from the circumferential edge of the top plate and has a thread formed in the inner surface thereof to come into screw engagement with the outer surface of the container mouth portion. An engaging means is provided between the inner surface of the skirt of the over-cap and the outer surface of the cylindrical wall of the inner cap to transmit the turn of the over-cap fitted onto the inner cap to the inner cap.

19 Claims, 19 Drawing Sheets

(51) Int. Cl.
*B65D 55/02* (2006.01)
*B65D 41/34* (2006.01)
*B65D 51/18* (2006.01)
*G08B 13/24* (2006.01)

(56) References Cited

U.S. PATENT DOCUMENTS

| | | | |
|---|---|---|---|
| 7,388,506 B2 * | 6/2008 | Abbott | 340/572.8 |
| 7,479,887 B2 * | 1/2009 | Meyer | 340/572.8 |
| 2005/0162277 A1 * | 7/2005 | Teplitxky et al. | 340/572.8 |
| 2006/0049948 A1 * | 3/2006 | Chen et al. | 340/572.7 |
| 2008/0314900 A1 | 12/2008 | Biesecker et al. | |

FOREIGN PATENT DOCUMENTS

| | | |
|---|---|---|
| JP | 4047821 B2 | 2/2008 |
| JP | 2009-1326 | 1/2009 |
| JP | 2011-213378 | 10/2011 |
| JP | 2011-227752 | 11/2011 |
| JP | 3182220 U | 3/2013 |

* cited by examiner (POLYHEDRAL TYPE)

(INVERSELY THREADED TYPE)

(RATCHET TYPE)

(FITTING TYPE)

(ANOTHER FITTING TYPE)

(MODIFIED FITTING TYPE)

Fig. 23 (ANTENNA BREAKING TYPE)

Fig. 24
(ANTENNA BREAKING TYPE)
(a)
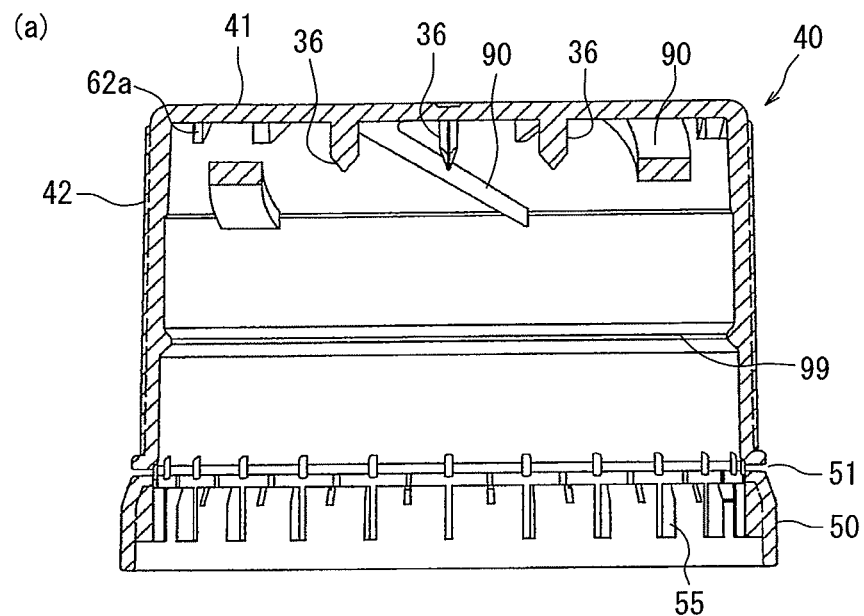
(b)
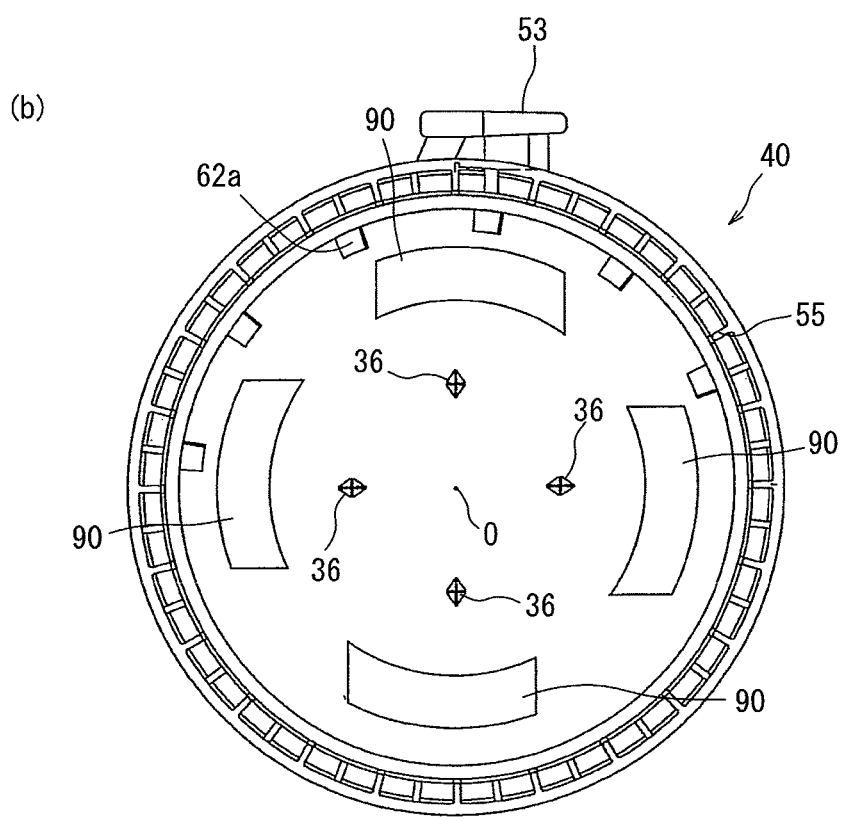

COMPOSITE CONTAINER LID WITH IC TAG

TECHNICAL FIELD

This invention relates to a packing member used for sealing the container mouth portion. More specifically, the invention relates to a packing member provided with an IC tag that stores product information.

BACKGROUND ART

Bar codes have heretofore been widely used for a variety of kinds of products to display product information such as date of production, names of the manufacturers and distributors, expiration dates, etc. Here, to read the coded information of bar codes by using a reader, the surface on where the bar codes are printed must be flat. Therefore, in the field of packing materials such as bottles and caps, limitation is imposed on the surface on where the bar codes are printed and also on the quantity of information that can be encoded.

In recent years, therefore, it is a trend to utilize the technology of displaying information by using an IC tag. Namely, the IC tag is also called RFID (radio frequency identifier), and is a very small communication terminal in the form of a tag that includes an IC chip storing predetermined information buried together with an antenna in a dielectric material such as resin or glass. The IC tag is for reading out product information stored in the IC chip byway of radio communication. A memory in the IC chip is capable of storing the data of, for example, several hundreds of bytes offering such an advantage that a lot of product information can be stored therein. Further, the IC tag is capable of reading out the recorded information in a non-contacting manner and is free of such a problem as wear caused by contact. Besides, it has such an advantage as being realized in a form that meets the form of the product and in small size and in reduced thickness.

A patent document 1, for example, discloses a cap having an IC tag buried in a top plate thereof when the cap is opened.

There has been proposed to use the above IC tag for displaying the history of unsealing of the container. For example, a patent document 2 discloses a method of detecting the unsealing relying on the breakage of the lead wire that connects the IC chip to the antenna in the IC tag.

Further, a patent document 3 discloses an art of recognizing the fact of unsealing based on that an antenna provided in the cap body is broken accompanying the unsealing of the upper lid coupled to the cap body that is fitted onto the container mouth portion.

According to these patent documents 2 and 3, the fact that the IC tag is broken is detected by an external reader device to recognize the fact of unsealing still leaving, however, a problem that must be solved.

According to the art proposed in the patent document 2, for instance, the IC chip of the IC tag is provided in the container body or in a portion belonging to the container body (concretely, in a tamper evidence band that is cut off from the cap when it is opened), the antenna and the lead wire are provided in a cap that is fitted by screw onto the container body, and the lead wire is broken when the cap is unsealed.

When the container body is to be provided with the IC chip, on the other hand, the antenna and the lead wire that connects the IC chip to the antenna are provided in the cap which is separate from the container. In fact, however, it can be said that this constitution cannot be implemented. This is because, the cap is provided with the IC tag of which the antenna and the IC chip are connected together through the lead wire. The cap is then fitted onto the container mouth portion and, thereafter, the IC chip portion only is stuck onto the container. In this case, however, the cap must be fitted onto the container mouth portion in a state where the IC chip is hanging down requiring a very cumbersome operation (capping operation) accompanied by such a probability that the IC chip and the lead wire are liable to be broken during the capping operation. Besides, it is not easy to stick the IC chip hanging down from the cap onto the container.

Further, in case the IC chip is provided on the tamper evidence band (TE band) that will be separated away from the cap when it is opened, difficulty is involved in fitting the IC chip on the TE band. More than that, it is not allowed to sufficiently prove the fact of unsealing based on the breakage of the lead wire that connects the IC chip to the antenna. That is, in this case, the breakage of the IC tag stands for the separation of the TE band, and the TE band that is separated away proves the history of unsealing of the cap. It will, therefore, be understood that the history of unsealing of the cap is proved by the separation of the TE band despite the history of unsealing has not been proved by the breakage of the IC tag.

According to the means of the patent document 3, furthermore, the IC tag is provided on a lid member that is separate from a lid member that is sealing the container mouth portion, and the lid member sealing the container mouth portion is unsealed quite separately from the operation for breaking the IC tag of the lid member in which the IC tag has been provided. That is, to unseal the container mouth portion according to the patent document 3, the IC tag must be broken in advance separately from the unsealing operation and, besides, the lid member (outer lid) that has the IC tag must be removed requiring, therefore, clumsy operation for unsealing the container mouth portion and, therefore, further improvements have been desired.

According to the known means of the patent documents 2 and 3, further, it is not allowed to read the information stored in the IC chip after the unsealing, posing limitation on the use of the IC tags.

PRIOR ART DOCUMENTS

Patent Documents

Patent document 1: JP-A-2005-321935
Patent document 2: Japanese Patent No. 4047821
Patent document 3: JP-A-2011-213378

OUTLINE OF THE INVENTION

Problems that the Invention is to Solve

It is, therefore, an object of the present invention to provide a composite container lid with IC tag, in which the IC tag is attached to a cap that is formed as a unitary structure so will not to be separated away, facilitating the capping operation for fitting the cap to which the IC tag has been attached, enabling the IC tag to be broken when a lid member sealing the container mouth portion is unsealed, and permitting the container mouth portion to be unsealed simply and easily in a series of operations, the composite container lid being capable of reliably indicating the fact that the container mouth portion has been unsealed when the IC tag is broken.

Another object of the present invention is to provide a composite container lid with IC tag which enables the information stored in an IC chip of the IC tag to be read out even after the container has been unsealed.

According to the present invention, there is provided a composite container lid which comprises an inner cap fitted onto the container mouth portion by screw engagement, an over-cap fitted onto the inner cap, and an IC tag; wherein the over-cap has a top panel and a skirt descending from the circumferential edge of the top panel;

the inner cap has a top plate and a cylindrical wall descending from the circumferential edge of the top plate and having a thread formed in the inner surface thereof to come into screw engagement with the outer surface of the container mouth portion;

an engaging means is provided between the inner surface of the skirt of the over-cap and the outer surface of the cylindrical wall of the inner cap to transmit the turn of the over-cap fitted onto the inner cap to the inner cap; and the IC tag is attached to the inner cap or to the over-cap in a manner that a circuit inclusive of an information transmission/reception antenna connected to an IC chip in the IC tag is broken by a motion of the over-cap relative to the inner cap caused at the time of unsealing the inner cap fitted onto the container mouth portion.

Effects of the Invention

In the composite container lid of the present invention, the IC tag is provided on either the inner cap or the over-cap, but is not provided spanning over the separate members. The IC tag is not, either, provided on a portion such as the TE band that will be separated away at the time of unsealing. Therefore, the IC tag can be easily attached without being broken at the time of fitting the inner cap onto the container mouth portion or fitting the over-cap onto the inner cap.

Further, the inner cap is unsealed being linked to the operation of unsealing the over-cap. The circuit connected to the IC chip in the IC tag is broken due to the motion of the over-cap relative to the inner cap caused by the above operation. Therefore, the inner cap will have been removed from the container mouth portion when the circuit in the IC tag is broken. That is, if the inner cap is applied to sealing the container mouth portion, then there is no need of separately conducting the operation for unsealing the container mouth portion, and the unsealing operation does not become cumbersome.

Further, the IC tag includes the IC chip and a circuit that has the antenna for transmitting and receiving information to and from the IC chip (i.e., the IC chip and the antenna are connected together through a lead wire). If the antenna circuit is broken as a result of unsealing the over-cap, therefore, information stored in the IC chip can no longer be read out by the external unit. That is, the fact of unsealing can be recognized as it becomes impossible to read out the information. According to the present invention, the IC tag is effectively prevented from being broken at the time of attaching the IC tag or at the time of capping the over-cap or the inner cap. Therefore, reading of information that is rendered impossible proves the fact that the cap was unsealed maintaining very high precision contributing to greatly improving the function for guaranteeing the quality of the contents and the function for preventing tampering.

In the present invention, in particular, the IC tag has not been provided on the TE band that will be separated away at the time of unsealing. Therefore, the history of unsealing is proved based on the breakage of the IC tag independently from proving the history of unsealing based on the TE band. Aided by the TE band, therefore, it is allowed to more reliably prove the history of unsealing.

In the present invention, it is desired that the IC tag is provided with a circuit dedicated to indicating the unsealing of the container (circuit for detecting the unsealing) and that the circuit for detecting the unsealing is connected to the IC chip in parallel with the above antenna circuit. Namely, at the time of unsealing, the circuit for detecting the unsealing is selectively broken, and a change in the voltage caused by a change in the electric resistance stemming from the breakage of the circuit is read by using an external reading device to know the fact of unsealing. According to this embodiment, the unsealing is displayed without breaking the IC chip, the antenna or the lead wire connecting the IC chip to the antenna. Even after unsealed, therefore, the information stored in the IC chip can be directly read out.

Upon providing the circuit for detecting the unsealing as described above, a trouble of the IC chip can be clearly distinguished from the unsealing, further improving the proof of history of unsealing. Even after unsealed, further, information in the IC chip can be read out and can be utilized for various objects such as campaigns.

In the composite container lid of the present invention, it is desired to employ such means that a gap is maintained between the upper surface of the top plate of the inner cap and the lower surface of the top panel of the over-cap fitted onto the inner cap, the IC tag is attached to either the lower surface of the top panel of the over-cap or to the upper surface of the top plate of the inner cap, and a cutter is formed on the inner cap or on the over-cap to break the circuit of the IC tag. Employment of the above means makes it possible, at the time of unsealing, to easily and reliably accomplish the unsealing by turning the inner cap in the unsealing direction while breaking the circuit of the IC tag by using various means.

According to the present invention, for example, employment is made of such means that:

(1) a stopper band is formed at the lower end of the skirt of the over-cap to limit the over-cap from ascending and/or descending when the inner cap is fitted onto the container mouth portion;

(2) the stopper band is positioned under the lower end of the cylindrical side wall of the inner cap, and the stopper band comes into engagement with the outer surface of the container mouth portion when the inner cap is fitted onto the container mouth portion to limit the over-cap from ascending and/or descending; and (3) the stopper band is provided so as to be separated away from the skirt of the over-cap.

This makes it possible to effectively prevent the circuit of the IC tag from being broken by the motion of the over-cap of before unsealing the container.

Specifically, when the above embodiment (3) is employed, the circuit of the IC tag is broken and the operation for unsealing the container is conducted after the stopper band is separated away. Namely, the container which is still in the unsealed state can also be confirmed by the presence of the stopper band, contributing to enhancing the function for preventing tampering and for further improving the function for guaranteeing the quality of the content in the container.

The composite container lids provided with the above stopper band can be classified into those of the polyhedrally engaging type, those of the inversely threaded type, those of the ratchet type and those of the fitting type depending on the types of engaging means that transmits the turn of the over-cap to the inner cap.

The composite container lid of the polyhdedrally engaging type is so embodied that:

(A) polyhedral portions are formed on the outer surface of the cylindrical wall of the inner cap and on the inner surface of the skirt of the over-cap so as to face each other and come in contact with each other, the polyhedral portions working as the engaging means to transmit the turn of the over-cap to the inner cap, wherein when the over-cap is turned in a direction in which the inner cap is unsealed, the over-cap is suppressed from ascending due to the stopper band while the inner cap is allowed to ascend by being turned in a direction in which it is unsealed, whereby the circuit of the IC tag is broken by the cutter, and the engagement is released between the stopper band and the outer surface of the container mouth portion after the circuit has been broken.

According to this embodiment, the container can be unsealed by turning the over-cap while readily breaking the circuit of the IC tag.

Further, the inner cap is removed from the container mouth portion in a state where the over-cap is being fitted onto the inner cap. Here, the inner cap can be easily separated away from the over-cap; i.e., the inner cap only can be used to easily seal the container mouth portion again, which is an advantage.

The composite container lid of the inversely threaded type is such that the stopper band is so provided as can be separated away from the over-cap as described above, and employs such means that:

(B) the outer surface of the cylindrical wall of the inner cap and the inner surface of the skirt of the over-cap are, respectively, threaded so as to be screw-engaged with each other, the threads serving as the engaging means to transmit the turn of the over-cap to the inner cap, the screw engagement between the outer surface of the cylindrical wall and the inner surface of the skirt being in an inversely threaded relationship relative to the screw engagement between the inner surface of the cylindrical wall of the inner cap and the outer surface of the container mouth portion, wherein after the stopper band is separated away, the circuit of the IC tag is broken by the cutter that descends accompanying the turn of the over-cap, and the inner cap turns in a direction in which it is unsealed as the over-cap continues to be turned.

According to this embodiment, the circuit of the IC tag is broken and the container is unsealed by simply turning the over-cap readily after the stopper band is separated away, offering such an advantage that the operation is very easily in addition to attaining the advantage of the above embodiment (3).

The composite container lid of the ratchet type is such that the stopper band is so provided as can be separated away from the over-cap, and is so embodied that:

(C) a cutting pawl is formed on the inner surface of the skirt of the over-cap, a vertical groove and a ratchet groove with an end are formed in the outer surface of the cylindrical wall of the inner cap, the vertical groove stretching in the vertical direction and the ratchet groove with an end stretching from the lower end of the vertical groove in the circumferential direction which is the unsealing direction, and the IC tag is so provided as to at least cover the ratchet groove;

the cutting pawl and the circumferential end portion of the ratchet groove work as the engaging means to transmit the turn of the over-cap to the inner cap and, at the same time, the cutting pawl also works as the cutter; and in a state where the stopper band is present, the cutting pawl is in engagement with the vertical groove to suppress the turn of the over-cap and in a state where the stopper band is separated away, the cutting pawl descends through the vertical groove to engage with the ratchet groove permitting the over-cap to be turned in a direction in which it is unsealed, and when the over-cap is turned in the direction in which it is unsealed, the cutting pawl moves through the ratchet groove in the unsealing direction to break the circuit of the IC tag that is so provided as to cover the ratchet groove, and as the over-cap is further turned in the unsealing direction, the cutting pawl comes in contact with the circumferential end portion of the ratchet groove causing the inner cap to be turned in the unsealing direction.

This embodiment is advantageous in regard to that the IC tag can be very easily attached to a position where the circuit can be broken (positioning can be easily attained). Therefore, this embodiment can be favorably applied to a case where the IC tag cannot be easily attached to the top plate of the inner cap or to the top panel of the over-cap, in especially the form of the IC tag is rectangular. With the composite container lid of this type, too, the circuit of the IC tag can be broken and the container can be unsealed by the operation of only turning the over-cap readily after the stopper band is separated away.

The composite container lid of the fitting type, too, is such that the stopper band is so provided as can be separated away from the over-cap, and employs such means that:

(D) downwardly protruding bumps are formed at the circumferential edge portion on the lower surface of the top panel of the over-cap, dents are formed in the circumferential edge portion on the upper surface of the top plate of the inner cap so as to be fitted with the bumps, the bumps and the dents working as the engaging means to transmit the turn of the over-cap to the inner cap, wherein when the over-cap is pushed in by separating the stopper band away, the circuit of the IC tag is broken by the cutter and, at the same time, the bumps enter in the dents and engage therewith permitting the inner cap to be turned by the over-cap in the unsealing direction.

This embodiment requires an operation for once pushing the over-cap in after the stopper band is separated away. Namely, the lid of this embodiment cannot be easily unsealed by infants offering the so-called child resistance, and, therefore, can be favorably applied to the containers for containing medicines.

With the above embodiment (6), further, the unsealing detection circuit in the IC tag is broken not by pushing the protuberance in but by being cut by the cutting pawl, offering an advantage in that the IC tag can be very easily attached to a position where the circuit can be broken (positioning is easily attained).

BRIEF DESCRIPTION OF THE DRAWINGS

FIG. 24 shows a side sectional view (a) of an over-cap fitted to the inner cap of FIG. 23 and a bottom view (b) thereof.

MODES FOR CARRYING OUT THE INVENTION

<IC Tag>

Figure 1:
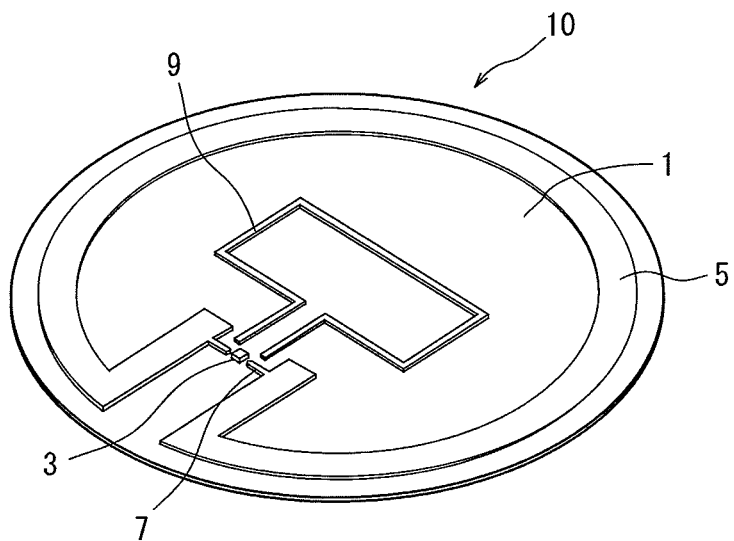
FIG. 1 is a perspective view illustrating an IC tag attached to a composite container lid of the present invention.

Referring to FIG. 1 showing an IC tag used in the invention, the IC tag generally designated at 10 is provided, on the surface of a film base member 1, with a circuit that includes an IC chip 3 and a metal antenna (for transmitting/receiving information) 5, the metal antenna 5 being electrically connected to the IC chip 3 through a lead wire 7. The IC tag 10 is, further, provided with an unsealing detector circuit 9 in parallel with the circuit that includes the metal antenna 5. The circuit 9, too, is connected to the IC chip 3 through the lead wire 7.

The film base member 1 is, usually, made from a thermoplastic resin that can be heat-melt adhered. As the thermoplastic resin, though not specifically limited, there is, usually, used the same resin as the resin base member that constitutes an over-cap and an inner cap (these caps will be described later) to which the IC tag 10 will be attached. For instance, if the IC tag 10 is to be attached to the cap made from a polyolefin, then it is desired that the film 1 is made from the polyolefin. Further, there has been placed in the market the IC tag 10 with the IC chip 3 and the metal antenna 5 being formed on a polyethylene terephthalate resin film. In such a case, it is desired that a polyolefin resin layer such as of polyethylene or polypropylene is laminated on the back surface of the polyethylene terephthalate resin film 1 by using a suitable adhesive such as acid-modified olefin resin from the standpoint of attaching the IC tag 10 to the cap.

As the film substrate 1, further, there can also be used a paper.

The IC chip 3 is, for example, flip-chip-mounted so as to be electrically conductive to the antenna 3, and stores the information related to a product to which the IC tag 10 is attached as the signals are sent thereto through the antenna 3. Further, the information stored in the IC tag 10 is read out through the antenna 3.

The IC chip 3 is, usually, protected by being molded with an electrically insulating curable resin such as polyimide or bismaleimide resin. The IC chip 3 can be, further, molded by being stuck with a paper.

As described already, the IC chip 3 is storing information related to the content in the packing container (e.g., producer, manufacturer, date of production, date of shipment, etc.), information related to the container, as well as information such as a change in the voltage that indicates the unsealing. The information is input or output in the form of high frequency signals utilizing chiefly the UHF band near 900 MHz or a frequency band of 13.56 MHz.

Here, the IC tag 10 and the circuit including the antenna 3 are not limited to those of the form shown in FIG. 1. For instance, they may be in a rectangular form, or the unsealing detector circuit 9 may be in a multiplicity of spiral form. The unsealing detector circuit 9 does not have to be provided, as a matter of course.

Figure 2:
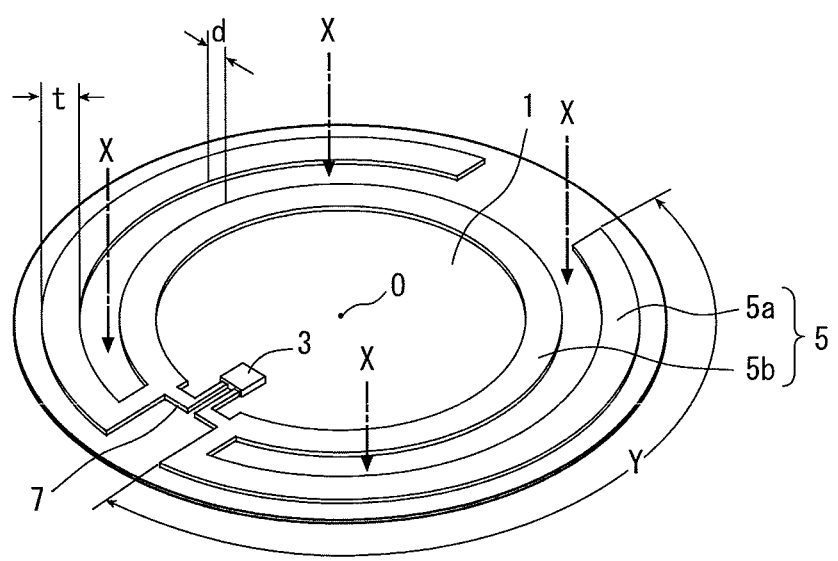
FIG. 2 is a perspective view illustrating another IC tag attached to the composite container lid of the present invention.

Further, the antenna 5 may often be in a multiplicity of forms. Referring to FIG. 2, for example, the IC tag 10 has no unsealing detector circuit 9, and the antenna 5 includes a multiplicity of line portions Y in which two arcuate lines 5a and 5a are extending maintaining a gap d. In this example, the antenna 5 has two arcuate lines 5a to form the multiplicity of line portions Y. The number thereof, however, may be further increased. Besides, the thickness t of the arcuate lines 5a (width in the radial direction) needs not be specifically limited and is so set as to possess a resonating length that meets the frequency of the signals that are used.

In the example of FIG. 2, the arcuate lines 5a and 5a are forming part of a circle but may also be forming part of an ellipse or of any other shape. Further, the lines 5a may often be forming a complete circle.

The unsealing detector circuit 9 may be so set as to, when it is broken and changes its resistance, brings about a change in the voltage in the IC chip 3.

The antenna 5, the unsealing detector circuit 9 and the lead wires 7 that connect them to the IC chip 3, are, usually, made from a thin film of a low-resistance metal such as aluminum, copper, silver or gold (having a thickness of about 5 to about 50 μm), and can be formed by, for example, sticking or plating a metal foil, by etching, or by printing an electrically conducting ink such as silver paste.

The film base material 1 should have such a thickness as to maintain a strength large enough for carrying out the operation for mounting the IC chip 3 on the surface thereof or for carrying out the plating operation for forming the antenna 5, unsealing detector circuit 9 and lead wires 7, i.e., should have a suitable thickness depending on the mode of being fitted onto the cap. For instance, the thickness may be relatively small in case the film base member 1 is to be heat-adhered to the cap over its back surface (on where no IC chip has been provided) or over the portion of its front surface where no metal antenna is present. The thickness, however, must be relatively large in case the film base material 1 is to be attached to the cap by fitting. From the above point of view, it is desired that the film base member 1 has a thickness, usually, in a range of about 5 to about 1000 μm, i.e., a thickness that meets the mode of fitting within this range.

In FIG. 1, further, the film base member 1 has the shape of a disk, but may assume a suitable shape depending on the mode of attachment or the position where the circuit breaks, and does not necessarily have to be of a circular shape.

In the composite container lid of the present invention, the position for attaching the IC tag 10 is set depending on the form of the IC tag 10 or the form of the circuit that is to be broken.

The composite container lid of the present invention includes an inner cap that is fitted onto the container mouth portion and an over-cap that is fitted onto the inner cap. The composite container lids can be roughly divided into those of the four types, i.e., those of the polyhedrally engaging type, those of the inversely threaded type, those of the ratchet type and those of the fitting type, depends on the engaging type between the over-cap and the inner cap.

<Composite Container Lid of the Polyhedrally Engaging Type>

Referring to FIGS. 3 to 6 showing a composite container lid of the polyhedrally engaging type, an inner cap (generally designated at 30) is fitted by screw-engagement onto the mouth portion (generally designated at 20) of a container such as bottle, and an over-cap (generally designated at 40) is fitted onto the inner cap 30.

A thread 21 is formed at an upper part on the outer surface of the container mouth portion 20, a flange portion 23 is formed on the lower side thereof, and a support ring 25 which is a protuberance having the greatest diameter is formed further on the lower side thereof.

In the cases of the other composite container lids of different types, too, basically the same things apply to the forms of the inner cap 30, over-cap 40, and to the outer surface of the container mouth portion 20.

Figure 3:
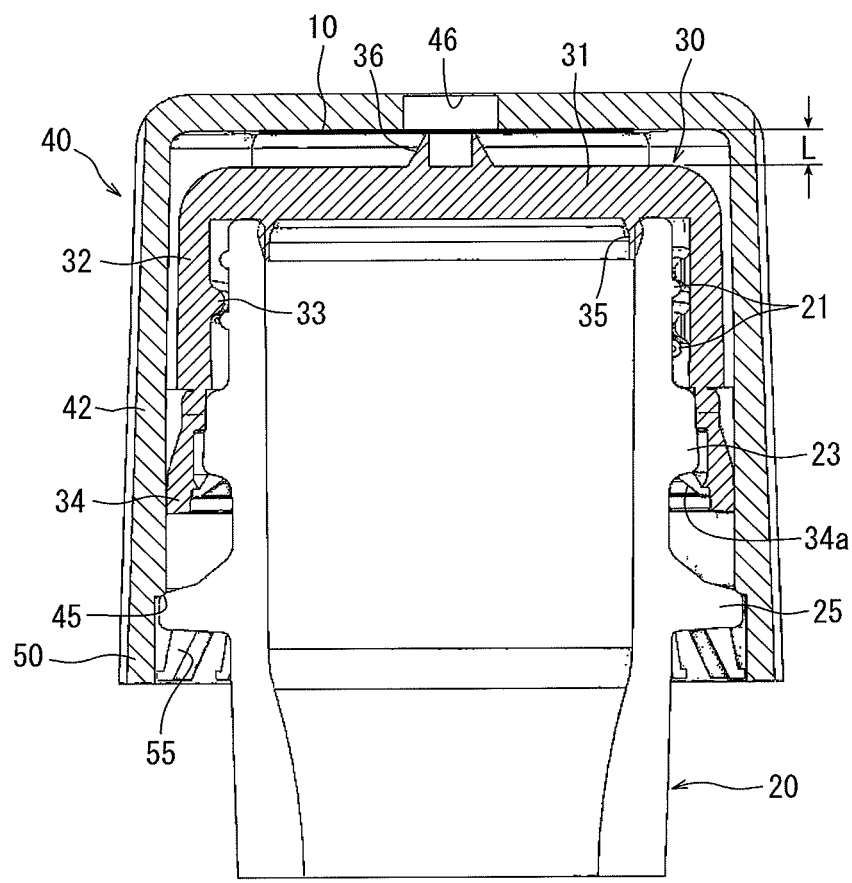
FIG. 3 is a side sectional view of a composite container lid of a polyhedrally engaging type of the present invention.

The inner cap 30 has a top plate 31 and a cylindrical wall 32 descending from the circumferential edge of the top plate. A thread 33 is formed on the inner surface of the cylindrical wall 32 as shown in FIG. 3. Namely, the inner cap 30 is held on the container mouth portion 20 due to the screw-engagement of the thread 33 with the thread 21 on the outer surface of the container mouth portion 20.

At the lower end of the cylindrical wall 32, a holder band (or a tamper evidence band) 34 is provided integrally with the cylindrical wall 32 to firmly hold the inner cap 30. Referring to FIG. 3, the holder band 34 is extending up to the lower side of the flange portion 23 on the outer surface of the container mouth portion 20. The holder band 34 has an engaging protuberance (or flap piece) 34a formed on the inner surface thereof to engage with the surface on the lower side of the flange portion 23. The inner cap 30 is firmly held on the outer surface of the container mouth portion 20 due to the engagement of the engaging protuberance 34a with the flange portion 23.

Figure 4:
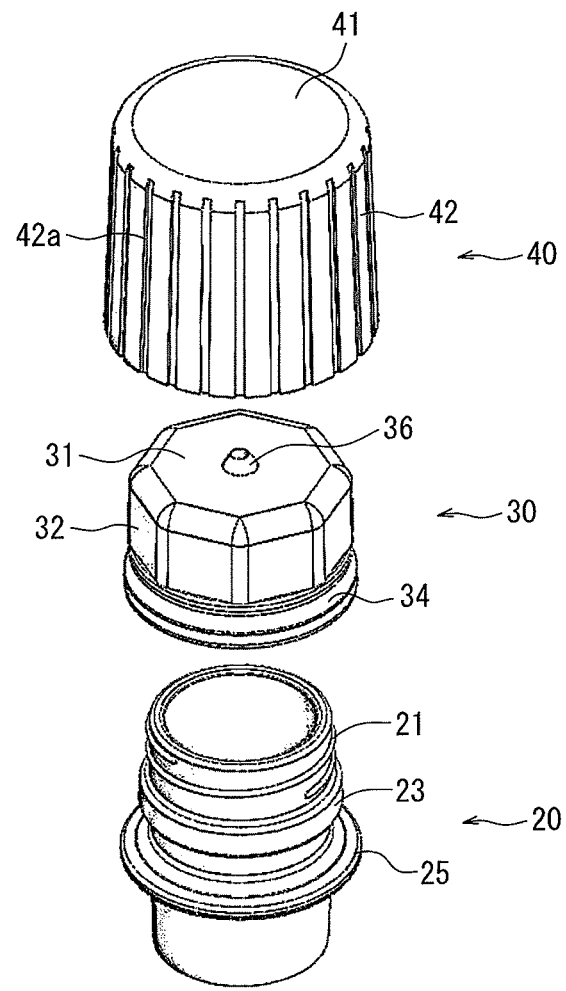
FIG. 4 is a perspective disassembled view of the composite container lid of FIG. 3.

As will be understood from FIG. 4, further, the cylindrical wall 32 has a polyhedral outer surface which engages with the inner surface of the over-cap 40 that will be described later.

An inner ring 35 is provided along the circumferential portion on the lower surface of the top plate 31 of the inner cap 30 maintaining a gap relative to the cylindrical wall 32 (see FIG. 3). Namely, the upper end of the container mouth portion 20 enters into a space between the cylindrical wall 32 and the inner ring 35, and the outer surface of the inner ring 35 comes into close contact with the inner surface of the upper end portion of the container mouth portion 20 to assure the sealing of the interior of the container.

A cutter 36 (protrusion having a sharp end) is formed on the upper surface of the top plate 31 at the central portion thereof. The cutter 36 works to break the circuit of the IC tag 10 (e.g., unsealing detector circuit 9 shown in FIG. 1) attached to the over-cap 40.

The over-cap 40 that is fixed being fitted onto the inner cap 30 has a top panel 41 and a skirt 42 descending from the circumferential edge of the top panel 41.

Figure 5:
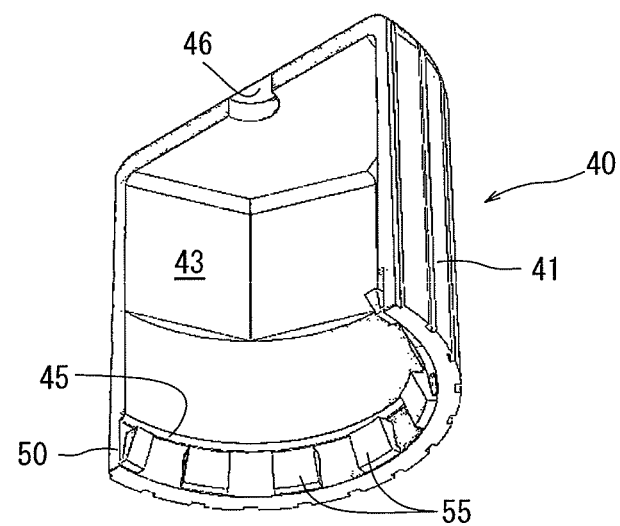
FIG. 5 is a perspective cut view of an over-cap of the composite container lid of FIG. 3.

At an upper part of the inner surface of the skirt 42 as shown in FIG. 5, there is formed a polyhedral portion 43 that corresponds to the polyhedral outer surface of the cylindrical wall 32 of the inner cap 30. That is, due to the engagement of the polyhedral portion 43 with the polyhedral outer surface of the cylindrical wall 32 of the inner cap 30, the inner cap 30 is turned accompanying the turn of the over-cap 40.

The outer surface of the skirt 42 is knurled as designated at 42a to facilitate the turn of the over-cap 40.

Referring to FIG. 3, a stopper band 50 is formed at the lower end portion of the skirt 42, and engaging protuberances 55 are formed on the inner surface thereof. The engaging protuberances 55 come into engagement with the lower surface of the support ring 25 on the outer surface of the container mouth portion 20 to limit the over-cap 40 from ascending. In this case, the engaging protuberances 55 come into strong engagement with the lower surface of the support ring 25, the force of engagement thereof being set to be stronger than the force of engagement between the holder band 34 (engaging protuberance 34a) of the inner cap 30 and the flange portion 23.

Further, the over-cap 40 has a step 45 formed in the inner surface thereof at the boundary between lower end of the skirt 42 and the stopper band 50. Namely, the step 45 comes into engagement with the upper surface of the support ring 25 to limit the over-cap 40 from descending.

Further, a dent 46 is formed in the lower surface of the top panel 41 at the center thereof to receive a cutter 36 provided on the upper surface of the top plate 31 of the inner cap 30. To the lower surface thereof, further, the above-mentioned IC tag 10 is attached as shown in FIG. 4. The IC tag 10 has not been shown in FIG. 5.

As described above, the IC tag 10 may be attached to the lower surface of the top panel 41 by insertion by adjusting the size of the resin film 1 of the IC tag 10 and fitting it thereto, or by using an adhesive or by heat-sealing.

In this case, a portion positioned on the dent 46 is broken by the cutter 36. Therefore, the IC tag 10 is so attached that the unsealing detector circuit 9 (or any other circuit portion thereof) is located at the above position.

Referring to FIG. 3, when the over-cap 40 is provided being fitted onto the inner cap 30 that has been fitted onto the container mouth portion 20, the lower end of the skirt 42 and the engaging protuberance 55 of the band 50 are positioned on the lower side of the support ring 25 on the outer surface of the container mouth portion 20 while the step 45 at the boundary portion between the band 50 and the skirt 42 comes into engagement with the upper surface of the support ring 25. Therefore, a predetermined gap L is maintained between the lower surface of the top panel 41 of the over-cap 40 and the upper surface of the top plate 31 of the inner cap 30. As a result, the IC tag 10 (unsealing detector circuit 9 or other circuit portion) is held without being broken.

With the composite container lid of the present invention having the structure as described above, if the over-cap 40 is turned in a direction in which it is unsealed, the polyhedral inner surface 43 of the skirt 42 comes in engagement with the outer surface (polyhedral surface) of the cylindrical wall 32 of the inner cap 30, and the inner cap 30, too, turns in a direction in which it is unsealed.

Being liberated from the screw-engaged state, therefore, the inner cap 30 rises along the outer surface of the container mouth portion 20, and the engaging protuberance 34a goes over the flange portion 23 formed on the outer surface of the container mouth portion 20. In the over-cap 40, on the other hand, the engaging protuberances 55 of the stopper band 50 are still strongly engaged with the support ring 25 of the container mouth portion 20, preventing it from rising. Therefore, if the over-cap 40 is continuously turned in the direction in which it is unsealed, the cutter 36 of the inner cap 30 pierces through the unsealing detector circuit 9 (or other circuit portion thereof) of the IC tag 10 attached to the over-cap 40. If further turned, the over-cap 40 is pushed up by the inner cap 30, whereby the engaging protuberances 55 of the band 50 go beyond the support ring 25 of the container mouth portion 20 and, therefore, the over-cap 40 rises together with the inner cap 30 and is removed from the container mouth portion 20 in a state of being fitted onto the inner cap 30.

The inner cap 30 and the over-cap 40 thus removed from the container mouth portion 20 can be fitted again onto the container mouth portion 20 to reseal it in a state where the over-cap 40 is being fitted onto the inner cap 30. Or, the over-cap 40 may be taken away, and the inner cap 30 only may be used again to reseal the container mouth portion 20.

As will be understood from the above description, if the inner cap 30 is once removed from the container mouth portion 20 to unseal the container, the circuit portion is broken in the IC tag 10 that is attached to the over-cap 40. In a state where the unsealing detector circuit 9 is broken, for example, none of the IC chip 3, the antenna 5 and the lead wires 7 has been broken, permitting information stored in the IC chip 3 to be read out by using an external reader unit. The information includes such information that the unsealing detector circuit 9 has been broken. If the antenna 5 is broken, then no information can be read out from the IC chip 3 as a matter of course.

Therefore, even if the container mouth portion 20 has been resealed by the inner cap 30 with the over-cap 40 being fitted thereon, a general customer is allowed to correctly recognize the fact of unsealing upon reading information from the IC chip 3 by using, for example, a cell phone (or upon becoming quite unable to read information). Thus, the composite container lid provides excellent function for preventing tampering and is capable of effectively preventing unauthorized use such as exchanging the content by recognizing the fact of unsealing.

In the composite container lid of the polyhedrally engaged type, the IC tag 10 can also be attached to the upper surface of the top plate 31 of the inner cap 30. In this case, the cutter 36 is provided on the lower surface of the top panel 41 of the over-cap 40, and the dent 46 is formed in the upper surface of the top plate 31 at the center thereof to receive the cutter 36.

With this composite container lid, the over-cap is simply turned in a direction in which it is unsealed to break the IC tag 10 (unsealing detector circuit 9 or other circuit portion thereof) and to remove (unseal) the inner cap 30 from the container mouth portion 20.

<Composite Container Lid of the Inversely Threaded Type>

Referring to FIGS. 6 to 9, like that of the polyhedrally engaging type mentioned above, the composite container lid of this type, too, has an inner cap 30 fitted by screw-engagement onto the container mouth portion 20, and has an over-cap 40 fitted onto the inner cap 30.

That is, a thread 21, a flange portion 23 and a support ring 25 are formed on the outer surface of the container mouth portion 20 in this order from the upper side.

Figure 6:
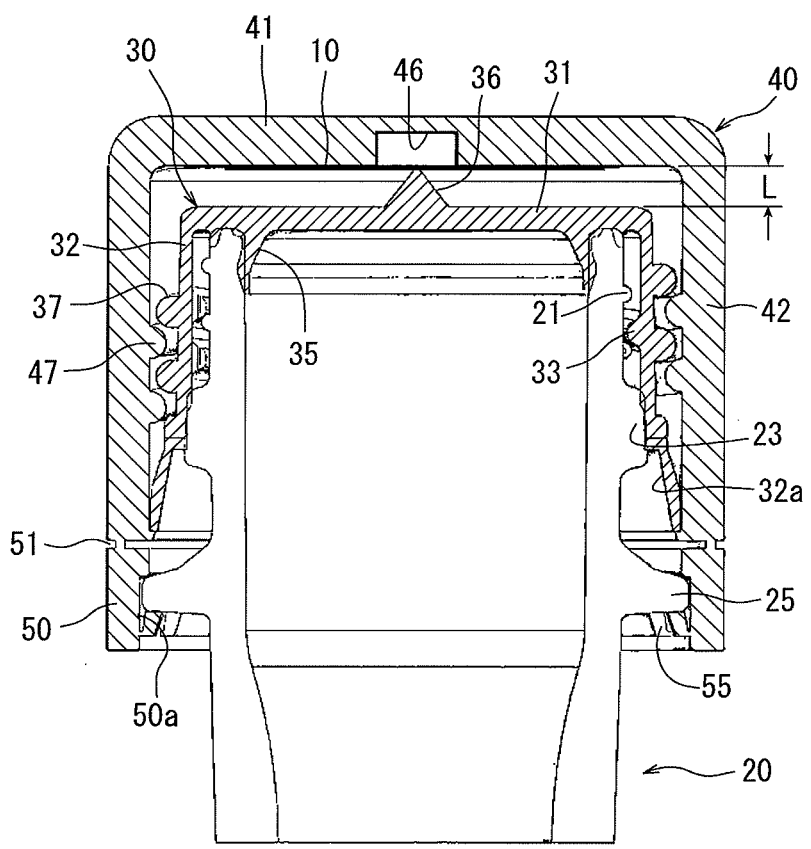
FIG. 6 is a side sectional view of a composite container lid of the inversely threaded type of the present invention.
Figure 7:
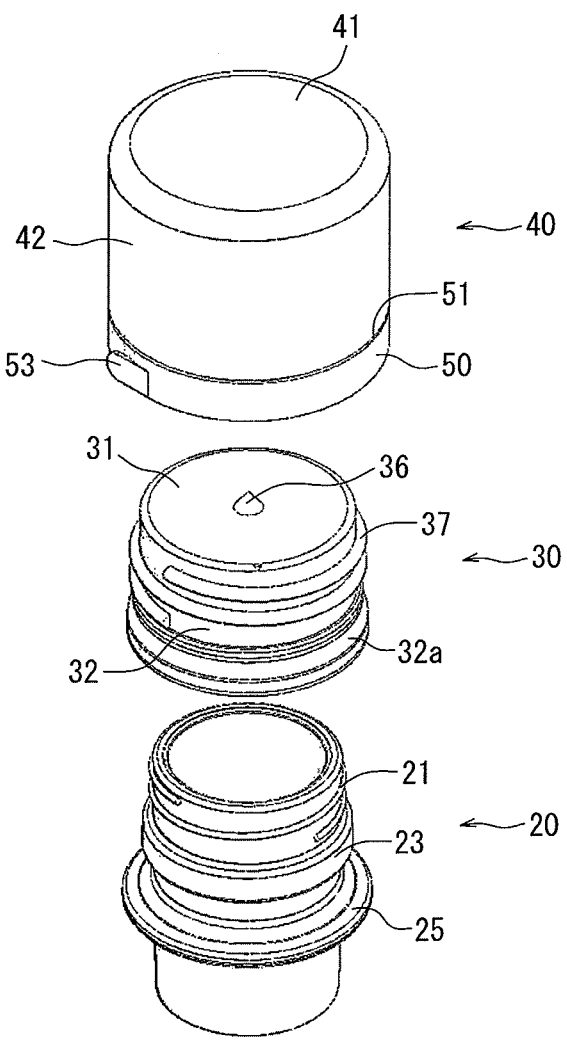
FIG. 7 is a perspective disassembled view of the composite container lid of FIG. 6.

The inner cap 30 has a top plate 31 and a cylindrical wall 32 descending from the circumferential edge of the top plate. A thread 33 is formed on the inner surface of the cylindrical wall 32 so as to come in screw-engagement with a thread 21 on the outer surface of the container mouth portion 20 as shown in FIG. 6. The inner cap 30 is held on the container mouth portion 20 due to the screw-engagement.

An inner ring 35 is provided along the circumferential portion on the lower surface of the top plate 31 of the inner cap 30 maintaining a gap relative to the cylindrical wall 32 (see FIG. 6). Namely, like the above-mentioned one of the polyhedrally engaging type, the upper end of the container mouth portion 20 enters into a space between the cylindrical wall 32 and the inner ring 35, and the outer surface of the inner ring 35 comes into close contact with the inner surface of the upper end portion of the container mouth portion 20 to assure the sealing.

In the composite container lid of the inversely threaded type, a cutter 36 is formed on the upper surface of the top plate 31 at the central portion thereof. The cutter 36 works to break the unsealing detector circuit 9 of the IC tag 10 attached to the over-cap 40.

In the composite container lid of the inversely threaded type, a thread 37 is provided on the outer surface of the cylindrical wall 32 of the inner cap 30 to come in screw-engagement with the over-cap 40.

The cylindrical wall 32 is, further, forming a flaring portion 32*a* at its lower part.

The over-cap 40, on the other hand, has a top panel 41 and a skirt 42 descending from the circumferential edge of the top panel 41.

On the inner surface of the skirt 42, there is formed a thread 47 that comes in screw-engagement with the thread 37 on the outer surface of the cylindrical wall 32 of the inner cap 30. Here, the screw-engagement has an inverse relationship to the screw-engagement between the inner surface of the inner cap 30 and the outer surface of the container mouth portion 20 (screw engagement between the thread 21 and the thread 33). That is, the direction of turn in which the screw-engagement is released between the over-cap 40 and the inner cap 30 is a direction of turn in which the screw-engagement is tightened between the inner cap 30 and the container mouth portion 20, and the direction of turn in which the screw-engagement is tightened between the over-cap 40 and the inner cap 30 is a direction of turn in which the screw-engagement is released between the inner cap 30 and the container mouth portion 20.

Further, the skirt 42 is forming a step portion 48 that is slightly protruding inward at the lower end on the inner surface thereof. The step portion 48 engages with the lower end of the flaring portion 32*a* of the cylindrical wall 32 of the inner cap 30 effectively preventing the over-cap 40 from escaping.

Further, a stopper band 50 is coupled to the lower end of the skirt 42 via a bridging portion 51 that can be torn off, and a grip 53 is provided on the outer surface of the band 50 so as to be nipped when it is to be torn off. That is, upon pulling the grip 53 in a circumferential direction, the bridging portion 51 is torn off and the stopper band 50 can be easily torn off from the skirt 42.

Figure 8:
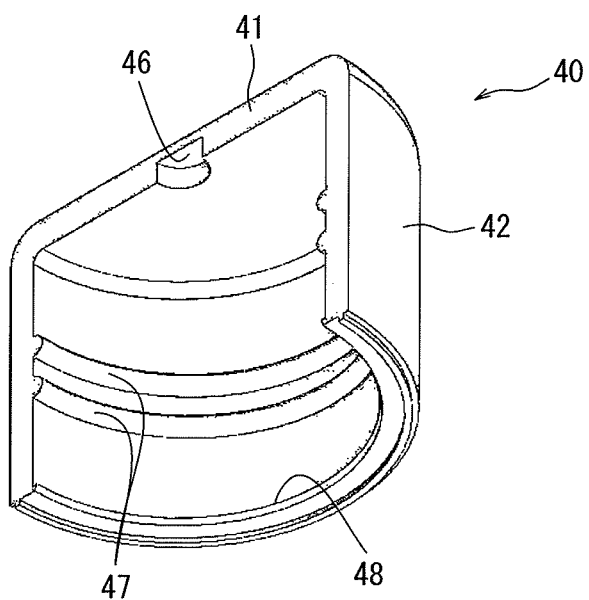
FIG. 8 is a perspective cut view of the over-cap of the composite container lid of FIG. 6.

FIG. 8 shows the over-cap 40 in a state where the stopper band 50 has been torn off.

The stopper band 50 has, in the inner surface thereof, a slightly dented surface 50*a* and, further, has an engaging protuberance 55 at the lower end thereof. As will be understood from FIG. 6, as the support ring 25 enters into the dented surface 50*a*, the step 48 at the lower end on the inner surface of the skirt 42 engages with the flaring portion 32*a* of the cylindrical wall 32 limiting the over-cap 40 from ascending while as the engaging protuberance 55 engages with the lower surface of the support ring 25 on the outer surface of the container mouth potion 20, the over-cap 40 is limited from descending.

Further, quite like that of the composite container lid of the polyhedrally engaging type, the top panel 41 has a dent 46 formed in the lower surface and at the center thereof to receive the cutter 36 provided on the upper surface of the top plate 31 of the inner cap 30, and has the IC tag 10 attached thereto (see FIG. 6). FIG. 8 shows neither the IC tag 10 nor the knurling 42*a* described above.

The IC tag 10, too, may be attached to the lower surface of the top panel 41 by mechanical means such as insertion depending on its size, or may be attached by using an adhesive or by heat-sealing.

The IC tag 10 is so attached that the unsealing detector circuit 9 of the IC tag 10 is located on a position above the dent 46.

With this composite container lid, when the over-cap 40 is provided being fitted onto the inner cap 30 that has been fitted onto the container mouth portion 20, the stopper band 50 (dented surface 50*a* and engaging protuberance 55) engages with the container mouth portion 90 (support ring 25), whereby a predetermined gap L is maintained between the lower surface of the top panel 41 of the over-cap 40 and the upper surface of the top plate 31 of the inner cap 30, and the over-cap 40 is so held that the IC tag 10 (unsealing detector circuit 9) will not be broken.

To unseal the composite container lid of the inversely threaded type of the invention having the structure as described above, first, the grip 53 is nipped and is torn off to separate the stopper band 50 away from the over-cap 40 (skirt 42). This permits the over-cap 40 to ascend.

Figure 9:
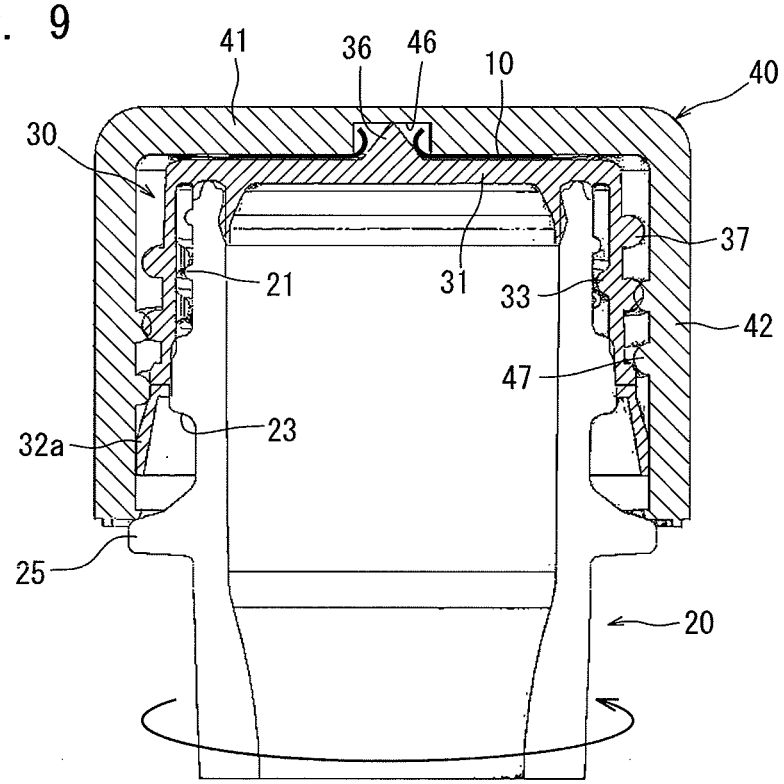
FIG. 9 is a side sectional view of when a circuit of the IC tag is broken in the composite container lid of FIG. 6.

Next, as shown in FIG. 9, if the over-cap 40 is turned in a direction in which the inner cap 30 is liberated from the container mouth portion 20 (unsealing direction indicated by an arrow in the drawing), the over-cap 40 descends in a direction in which it is tightened relative to the inner cap 30 due to the screw-engagement between the thread 47 on the inner surface of the skirt 42 and the thread 37 of the inner cap 30 (which is in an inverse relationship relative to the screw-engagement between the cap 30 and the container mouth portion). Here, however, the inner cap 30 turns in the direction in which it is unsealed, liberated from the screw-engagement with the container mouth portion 20, and ascends relative to the container mouth portion 20.

Therefore, if the over-cap 40 is continuously turned in the direction in which it is unsealed, the cutter 36 provided on the top plate 31 of the inner cap 30 pierces through the unsealing detector circuit 9 of the IC tag 10 attached to the over-cap 40. If further turned, the over-cap 40 ascends together with the inner cap 30, and is removed from the container mouth portion 20 in a state of being fitted onto the inner cap 30.

The inner cap 30 and the over-cap 40 thus removed from the container mouth portion 20 can be fitted again onto the container mouth portion 20 to reseal it in a state where the over-cap 40 is being fitted onto the inner cap 30. Or, the over-cap 40 may be taken away, and the inner cap 30 only may be used again to reseal.

In the composite container lid of the inversely threaded type, too, as described above, if the inner cap 30 is once removed from the container mouth portion 20 to unseal the container, the unsealing detector circuit 9 is broken in the IC tag 10 that is attached to the over-cap 40. Here, however, none of the IC chip 3, the antenna 5 and the lead wires 7 has been broken, permitting information stored in the IC chip 3 to be read out by using an external reader unit. The information includes such information that the unsealing detector circuit 9 has been broken.

Therefore, even if the inner cap 30 is fitted onto the container mouth portion 20 to seal it with the over-cap 40 being fitted thereon, a general customer is allowed to correctly recognize the fact of unsealing upon reading information from the IC chip 3 by using, for example, a cell phone. Thus, the packing body provides excellent function for preventing tampering and is capable of effectively preventing unauthorized use such as exchanging the content by recognizing the fact of unsealing.

In the composite container lid of the inversely threaded type, the IC tag 10 can also be attached to the upper surface of the top plate 31 of the inner cap 30. In this case, the protuberance 36 that serves as a cutter is provided on the lower surface of the top panel 41 of the over-cap 40, and the dent 46 is formed in the upper surface of the top plate 31 at the center thereof to receive the cutter 36.

The composite container lid of the above inversely threaded type cannot be unsealed unless the stopper band 50 is cut off. Therefore, the unsealing is detected relying on both the breakage of the IC tag 10 (unsealing detector circuit 9) and the separation of the stopper band 50 contributing greatly to improving the function of guaranteeing the quality of the content.

In the foregoing was described the structure of the composite container lid of the inversely threaded type by taking an example of breaking the unsealing detector circuit 9 in the IC tag 10. In the case where a portion other than the unsealing detector circuit 9 is to be broken, for example, the antenna 5 is to be broken, the IC tag 10 may be so positioned that the antenna 5 is located at the central portion. In this case, the unsealed fact can be recognized since information can no longer be read out from the IC chip 3.

<Composite Container Lid of the Ratchet Type>

Figure 10:
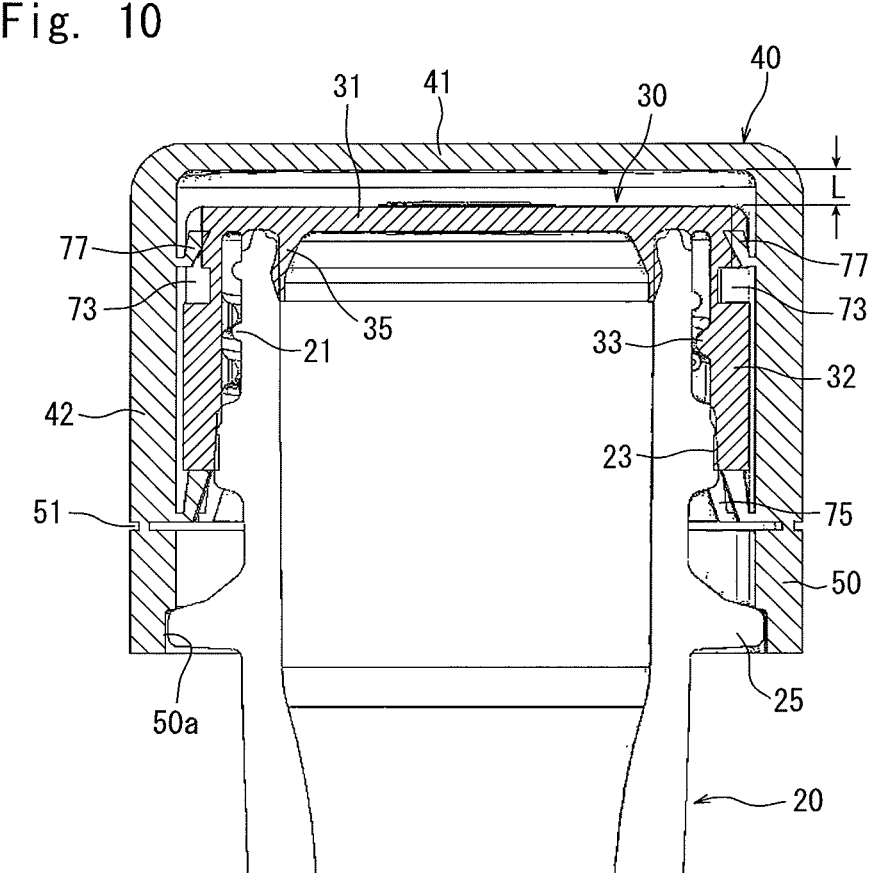
FIG. 10 is a side sectional view of the composite container lid of the ratchet type of the present invention.
Figure 11:
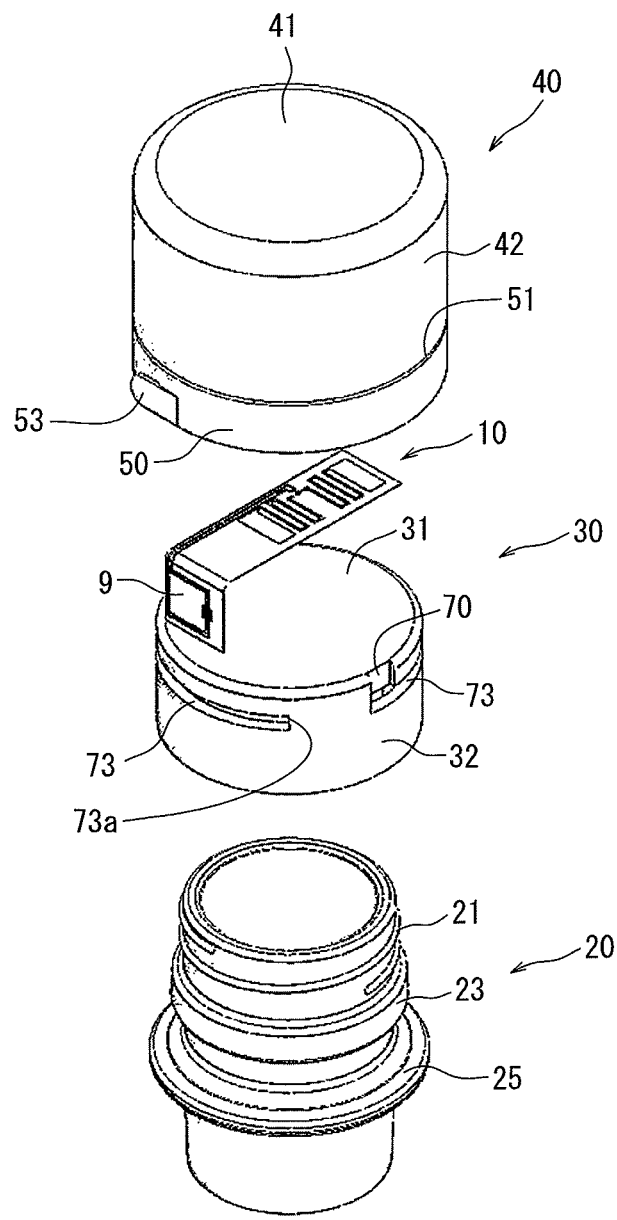
FIG. 11 is a perspective disassembled view of the composite container lid of FIG. 10.
Figure 12:
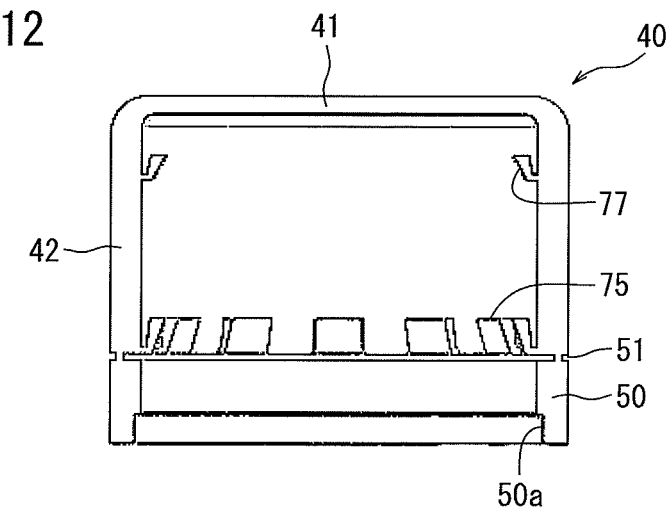
FIG. 12 is a side sectional view of an over-cap of the composite container lid of FIG. 10.

Referring to FIGS. 10 to 12, the composite container lid of the ratchet type, too, has an inner cap 30 fitted by screw-engagement onto the container mouth portion 20, and has an over-cap 40 fitted onto the inner cap 30.

The outer surface of the container mouth portion 20, too, is like those of the above-mentioned composite container lids of the polyhedrally engaging type and the inversely threaded type, and a thread 21, a flange portion 23 and a support ring 25 are formed in this order from the upper side.

The inner cap 30 has a top plate 31 and a cylindrical wall 32 descending from the circumferential edge of the top plate. A thread 33 is formed on the inner surface of the cylindrical wall 32 so as to come in screw-engagement with a thread 21 on the outer surface of the container mouth portion 20 as shown in FIG. 10. The inner cap 30 is held on the container mouth portion 20 due to the screw-engagement.

An inner ring 35 is provided along the circumferential portion on the lower surface of the top plate 31 maintaining a gap relative to the cylindrical wall 32. The upper end of the container mouth portion 20 enters into a space between the cylindrical wall 32 and the inner ring 35, and the outer surface of the inner ring 35 comes into close contact with the inner surface of the upper end portion of the container mouth portion 20 to assure the sealing.

Further, referring to a disassembled view of FIG. 11, a vertical groove 70 is formed in the outer surface of the cylindrical wall 32 stretching down in the vertical direction from the upper end thereof, and a ratchet groove 73 having an end is formed stretching from the lower end of the vertical groove 70 in a circumferential direction in which the inner cap 30 is unsealed. That is, in the composite container lid of the ratchet type, the inner cap 30 is unsealed by the over-cap 40 relying on the engagement which uses the ratchet groove 73.

Further, in the composite container lid of this type as will be understood from FIG. 11, the IC tag 10 is stuck by using an adhesive from the upper surface of the top plate 31 of the inner cap 30 over to the outer surface of the cylindrical wall 32 and, particularly, in a manner to cover the ratchet groove 73. Namely, the IC tag 10 is broken as a cutting pawl 75 that will be described below passes through the ratchet groove 73.

Therefore, the IC tag 10 is so attached that the circuit (unsealing detector circuit 9) that is to be broken is located on the ratchet groove 73.

In this embodiment, therefore, the IC tag 10, usually, assumes a rectangular shape.

The over-cap 40, on the other hand, has a top panel 41 and a skirt 42 descending from the circumferential edge of the top panel 41. To the lower end of the skirt 42 is linked a stopper band 50 via a bridging portion 51 that can be torn off like that of the composite container lid of the inversely threaded type described above. On the outer surface of the band 50 is provided a grip 53 that can be nipped to tear it off.

That is, upon pulling the grip 53 in the circumferential direction, the bridging portion 51 is turn off, and the stopper band 50 is easily torn off from the skirt 42.

A dented surface 50a is formed in the inner surface of the stopper band 50. As will be understood from FIG. 10, the support ring 25 is fitted in the dented surface 50a limiting the over-cap 40 from further descending.

As shown in FIG. 10 and FIG. 12, further, upwardly facing flap pieces 75 are formed on the inner surface of the skirt 42 at the lower end thereof. The flap pieces 75 engage with the lower end surface of the cylindrical wall 32 of the inner cap 30, forming a predetermined gap between the top plate 31 of the inner cap 30 and the top panel 41 of the over-cap 40 and preventing the over-cap 40 from escaping.

Referring to FIG. 12, further, a cutting pawl 77 is provided at an upper part on the inner surface of the skirt 42 of the over-cap 40. The cutting pawl 77 is fitted in the above-mentioned vertical groove 70 formed in the outer surface of the cylindrical wall 32 of the inner cap 30.

That is, with this composite container lid, the over-cap 40 is mounted being fitted onto the inner cap 30 that has been fitted to the container mouth portion 20. Here, the over-cap 40 is so positioned that the cutting pawl 77 engages with the vertical groove 70. To correctly attain the positioning, for example, a vertical rib for positioning may be formed on the outer surface of the skirt 42 of the over-cap 40 being corresponded to the position of the cutting pawl 77.

While the cutting pawl 77 is being held in the vertical groove 70, the IC tag 10 is not broken by the movement of the cutting pawl 77.

The operation for unsealing the composite container lid of the ratchet type having the above structure, too, starts with tearing the stopper band 53 off by nipping the grip 53. That is, the stopper band 50 is cut off from the over-cap 40 (skirt 42) which is then permitted to descend. By pushing the over-cap 40 in, therefore, the cutting pawl 77 enters into the ratchet groove 73 that is extending in the unsealing direction.

In this state, if the over-cap 40 is turned in the direction in which it is unsealed, the cutting pawl 77 turns through the ratchet groove 73 in the unsealing direction accompanying the turn of the over-cap 40. If the cutting pawl 77 passes through the portion to where the IC tag 10 is attached, then the unsealing detector circuit 9 in the IC tag 10 breaks.

Thereafter, if the over-cap 40 is further turned in the unsealing direction, the cutting pawl 77 comes in contact with the end portion 73a of the ratchet groove 73 whereby the inner cap 30, too, turns together with the over-cap 40 in the unsealing direction, and is released from the screw-engagement with the container mouth portion 20. Namely, the inner cap 30 is removed from the container mouth portion 20 in a manner that the over-cap 40 is being fitted onto the inner cap 30.

The inner cap 30 and the over-cap 40 thus removed from the container mouth portion 20 can be fitted again onto the container mouth portion 20 to reseal it in a state where the over-cap 40 is being fitted onto the inner cap 30. Or, the over-cap 40 may be taken away, and the inner cap 30 only may be used again to reseal.

The above-mentioned composite container lid of the ratchet type, too, is capable of selectively breaking the unsealing detector circuit 9 without breaking the IC chip 3, antenna 5 or lead wires 7. Therefore, even if the inner cap 30 is fitted onto the container mouth portion 20 to reseal it with the over-cap 40 being fitted thereon, a general customer is allowed to correctly read and recognize the fact of unsealing upon reading information from the IC chip 3 by using, for example, a cell phone. Thus, the packing body provides excellent function for preventing tampering and is capable of effectively preventing unauthorized use such as exchanging the content by recognizing the fact of unsealing.

The composite container lid of the ratchet type, too, clearly indicates the fact of unsealing based on the tear off of the stopper band 50 in addition to the breakage of the IC tag 10 (unsealing detector circuit 9) and, therefore, has a very excellent function for guaranteeing the quality of the content.

The above-mentioned composite container lid shown in FIGS. 10 to 12, too, has the structure in which the unsealing detector circuit 9 is broken at the time of unsealing. Here, if the IC tag 10 is so arranged that the circuit inclusive of the antenna 5 (e.g., inclusive of lead wires 7 and antenna 5) is broken at the time of unsealing, then no information can be read out from the IC chip 3 after the container mouth portion 20 is unsealed, and from which it is allowed to recognize the fact that the container mouth portion 20 has been unsealed.

<Composite Container Lid of the Fitting Type>

Referring to FIGS. 13 to 16, the composite container lid of the fitting type, too, has an inner cap 30 fitted onto the container mouth portion 20 by screw-engagement, and an over-cap 40 is fitted onto the inner cap 30.

The outer surface of the container mouth portion 20 is the same as those of the packing containers of the polyhedrally engaging type and the inversely threaded type mentioned above, and has a thread 21, a flange portion 23 and a support ring 25 formed thereon in this order from the upper side.

Figure 13:
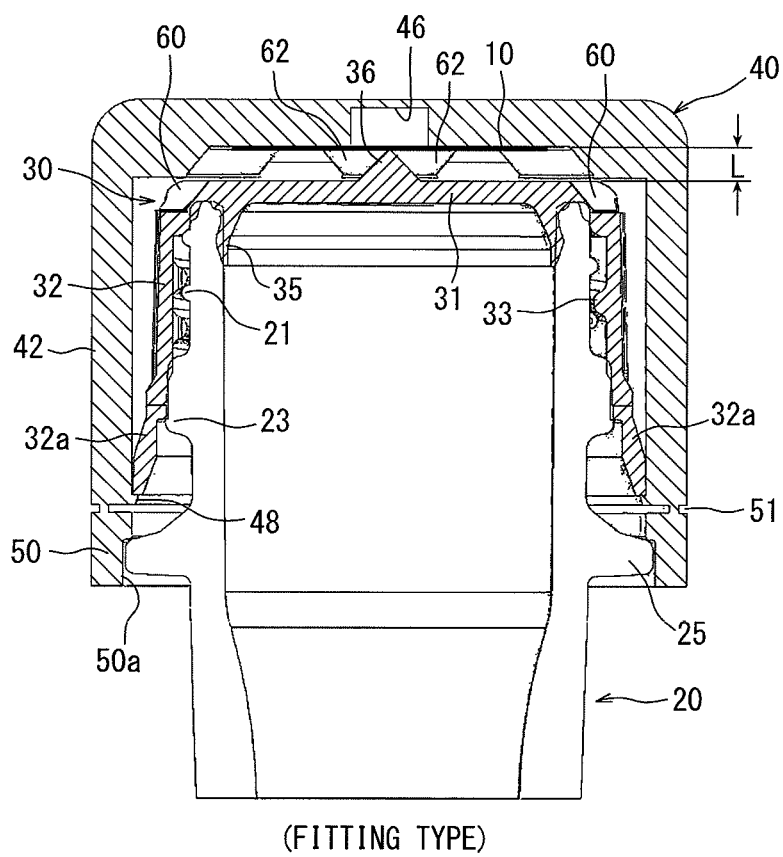
FIG. 13 is a side sectional view of a composite container lid of the fitting type of the present invention.

The inner cap 30 has a top plate 31 and a cylindrical wall 32 descending from the circumferential edge of the top plate. A thread 33 is formed on the inner surface of the cylindrical wall 32 so as to come in screw-engagement with a thread 21 on the outer surface of the container mouth portion 20 as shown in FIG. 13. The inner cap 30 is held on the container mouth portion 20 due to the screw-engagement.

Further, the outer surface of the cylindrical wall 32 is knurled in the upper part thereof so that it can be easily turned by hand at the time of releasing, i.e., at the time of unsealing and sealing the inner cap 30.

Further, the lower part of the cylindrical wall 32 is flaring as designated at 32a.

An inner ring 35 is provided along the circumferential edge portion on the lower surface of the top plate 31 of the inner cap 30 maintaining a gap relative to the cylindrical wall 32 (see FIG. 13). The upper end of the container mouth portion 20 enters into a space between the cylindrical wall 32 and the inner ring 35, and the outer surface of the inner ring 35 comes into close contact with the inner surface of the upper end portion of the container mouth portion 20 to assure the sealing.

Further, a cutter 36 is formed on the upper surface of the top plate 31 at the central portion thereof. The cutter 36 works to break the unsealing detector circuit 9 of the IC tag 10 attached to the over-cap 40.

Figure 14:
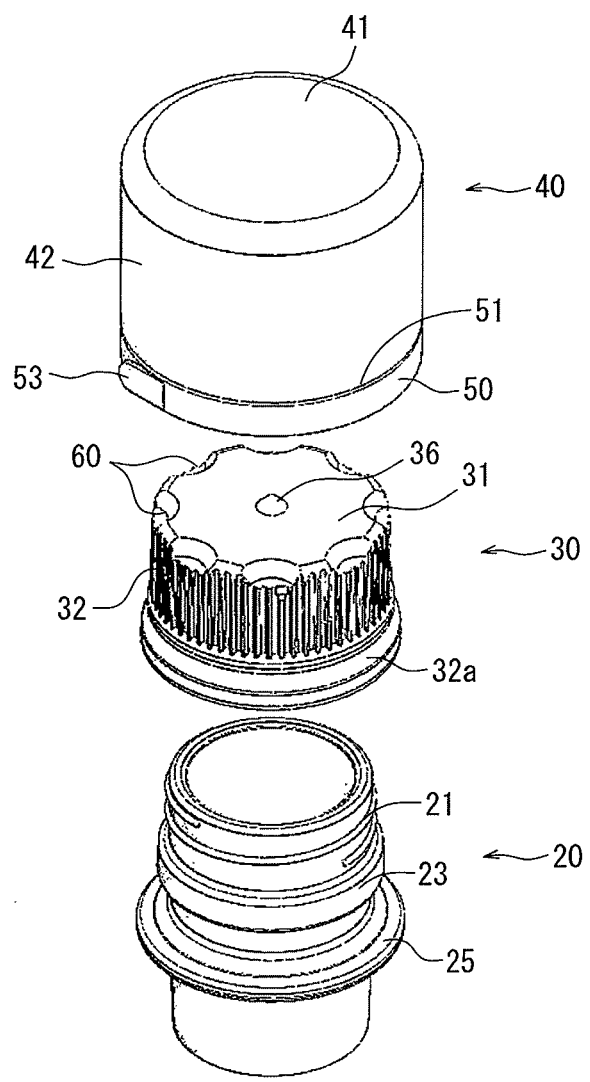
FIG. 14 is a perspective disassembled view of the composite container lid of FIG. 13.

In the composite container lid of the fitting type as shown in a disassembled view of FIG. 14, notches 60 for fitting are formed in the circumferential edge portion on the upper surface of the top plate 31 maintaining a suitable distance. Upon turning the over-cap 40 which is in engagement with the notches 60, the inner cap 30 can be turned.

The over-cap 40, on the other hand, has a top panel 41 and a skirt 42 descending from the circumferential edge of the top panel 41. The skirt 42 is forming a step portion 48 that is slightly protruding inward at the lower end on the inner surface thereof. The step portion 48 engages with the lower end of the flaring portion 32a of the cylindrical wall 32 of the inner cap 30 effectively preventing the over-cap 40 from escaping.

Further, like the above-mentioned composite container lid of the inversely threaded type, a stopper band 50 is coupled to the lower end of the skirt 42 via a bridging portion 51 that can be torn off, and a grip 53 is provided on the outer surface of the band 50 so as to be nipped when it is to be torn off.

That is, upon pulling the grip 53 in a circumferential direction, the bridging portion 51 is torn off and the stopper band 50 can be easily torn off from the skirt 42.

The stopper band 50 has, in the inner surface thereof, a dented surface 50a. As will be understood from FIG. 13, the support ring 25 enters into the dented surface 50a limiting the over-cap 40 from further descending.

Further, quite like that of the composite container lid of the polyhedrally engaged type, the top panel 41 has a dent 46 formed in the lower surface and at the center thereof to receive the cutter 36 provided on the upper surface of the top plate 31 of the inner cap 30, and has the IC tag 10 attached thereto (see FIG. 13).

Figure 15:
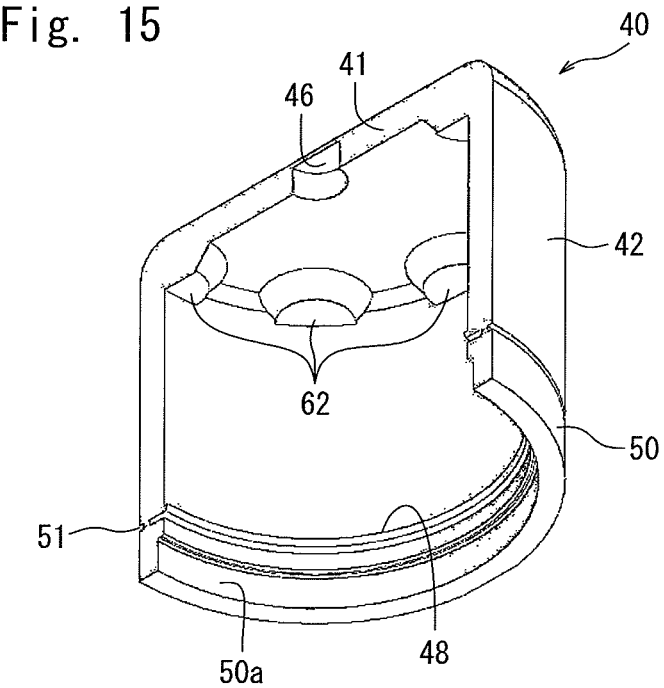
FIG. 15 is a perspective cut view of an over-cap of the composite container lid of FIG. 13.
Figure 16:
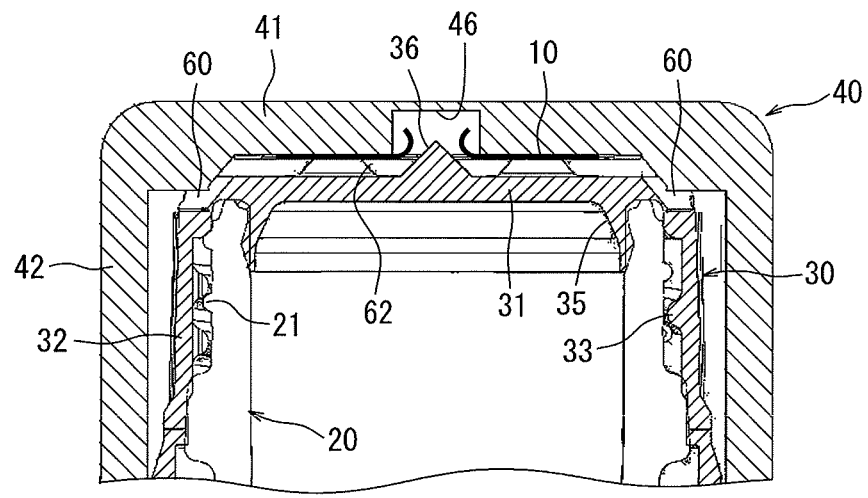
FIG. 16 is a side sectional view of when the circuit of the IC tag is broken in the composite container lid of FIG. 13.

The IC tag 10 has not been shown in FIG. 15.

The IC tag 10, too, may be attached to the lower surface of the top panel 41 by mechanical means such as insertion depending on its size, or may be attached by using an adhesive or by heat-sealing.

The IC tag 10 is so attached that the unsealing detector circuit 9 of the IC tag 10 is positioned above the dent 46.

Further, the top panel 41 has, on the lower surface and along the circumferential edge portion thereof, fitting bumps 62 so as to be corresponded to the fitting notches 60 of the inner cap 30 (FIG. 15).

That is, in the composite container lid, the caps 30 and 40 are fitted onto the container mouth portion 20, the over-cap 40 being fitted onto the inner cap 30. Here, the fitting dents 62 have been so set as to be positioned on the fitting notches 60. Further, due to the engagement between the stopper band 50 (dented surface 50a) and the container mouth portion 20 (support ring 25), a predetermined gap L is maintained between the inner surface of the top panel 41 of the over-cap 40 and the upper surface of the top plate 31 of the inner cap 30 so that the IC tag 10 (e.g., unsealing detector circuit 9) will not be broken.

To unseal the composite container lid of the fitting type of the invention having the structure as described above, first, the grip 53 is nipped and is torn off to separate the stopper band 50 away from the over-cap 40 (skirt 42) in the same manner as that of the above-mentioned composite container lid of the inversely threaded type. This permits the over-cap 40 to descend.

Next, if the over-cap 40 is pushed in, then the fitting bumps 62 fit into the fitting notches 60 and, at the same time, the protuberance (cutter) 36 provided on the top plate 31 of the inner cap 30 pierces through the unsealing detector circuit 9 of the IC tag 10 attached to the top panel of the over-cap 40 and enters into the dent 46.

Thereafter, if the over-cap 40 is turned in a direction in which it is unsealed, the inner cap 30, too, turns in the unsealing direction since the fitting bumps 62 have been fitted into the fitting notches 60, and is liberated from the screw-engagement with container mouth portion 20. Thus the inner cap 30 is removed from the container mouth portion 20 with the over-cap 40 being fitted thereon.

The inner cap 30 and the over-cap 40 thus removed from the container mouth portion 20 can be fitted again onto the container mouth portion 20 to reseal it in a state where the over-cap 40 is being fitted onto the inner cap 30. Or, the over-cap 40 may be taken away, and the inner cap 30 only may be used again to reseal.

In the composite container lid of the fitting type, too, as described above, if the inner cap 30 is once removed from the container mouth portion 20 to unseal the container, the unsealing detector circuit 9 is broken in the IC tag 10 that is attached to the over-cap 40. Here, however, none of the IC chip 3, the antenna 5 and the lead wires 7 has been broken, permitting information stored in the IC chip 3 to be read out by using an external reader unit. The information includes such information that the unsealing detector circuit 9 has been broken.

Therefore, even if the inner cap 30 is fitted onto the container mouth portion 20 to reseal it with the over-cap 40 being fitted thereon, a general customer is allowed to correctly read and recognize the fact of unsealing upon reading information of the IC chip 3 by using, for example, a cell phone. Thus, the packing body provides excellent function for preventing tampering and is capable of effectively preventing unauthorized use such as exchanging the content by recognizing the fact of unsealing.

In the composite container lid of the fitting type, too, the IC tag 10 can also be attached to the upper surface of the top plate 31 of the inner cap 30. In this case, a cutter 36 is provided on the top panel 41 of the over-cap 40, and a dent 46 is formed in the upper surface of the top plate 31 at the center thereof to receive the protuberance 36.

It is also allowable to form dents or grooves that correspond to the fitting notches 60 in the lower surface of the top panel 41 of the over-cap 40 and to form the fitting bumps 62 on the upper surface of the top plate 31 of the inner cap 30.

To unseal the composite container lid of the fitting type, an operation is necessary to tear the stopper band 50 off and turn the over-cap 40 by pushing it in, effectively preventing such an inconvenience that an infant may easily unseal it and, therefore, providing excellent child resistance.

Further, the unsealing is detected relying on both the breakage of the IC tag 10 (unsealing detector circuit 9) and the tear off of the stopper band 50, offering a very excellent function for guaranteeing the quality of the content.

In the composite container lid of the fitting type mentioned above, further, it is desired that vertical ribs for positioning are formed in a suitable number on the outer surface of the skirt 42 of the over-cap 40 so that the inner cap 30 and the over-cap 40 can be correctly fitted onto the container mouth portion 20 without being deviated in position.

Namely, in this composite container lid, the over-cap 40 is, first, fitted onto the inner cap 30. At this moment, the fitting bumps 62 are set to be positioned between the fitting dents 60 by using the positioning ribs. This prevents the over-cap 40 (fitting bumps 62) from deeply descending and, therefore, reliably prevents the IC tag 10 from being broken.

Further, the inner cap 30 is fitted onto the container mouth portion 20 with the over-cap 40 being fitted thereon as described above. Next, the over-cap 40 is turned in the sealing direction, and the fitting bumps 62 are set to be positioned on the fitting bumps 60 by utilizing the positions of the positioning ribs mentioned above to thereby assemble the packing container of the fitting type having the structure as shown in FIG. 13.

In this embodiment, too, if a portion other than the unsealing detector circuit 9 is to be broken, e.g., if the antenna 5 is to be broken, then the IC tag 10 may be so positioned that the antenna 5 is located at the central portion. In this case, the fact of unsealing can be recognized as no information is read out from the IC chip 3.

<Another Composite Container Lid of the Fitting Type>

The composite container lid of the above-mentioned fitting type can be designed and modified in various other ways. For instance, the over-cap 40 is provided with a resilient strip to effectively prevent accidental breakage of the circuit of the IC tag 10 while the composite container lid is being assembled or being fitted onto the container mouth portion.

FIGS. 17 to 21 show the structure of the composite container lid of the fitting type provided with the resilient strip.

That is, referring to FIGS. 17 to 21, this composite container lid, too, has the basic structure similar to that of the above composite container lid of FIGS. 13 to 16. For instance, the inner cap 30 is fitted onto the container mouth portion 20 by screw-engagement, and the over-cap 40 is fitted onto the inner cap 30.

Figure 17:
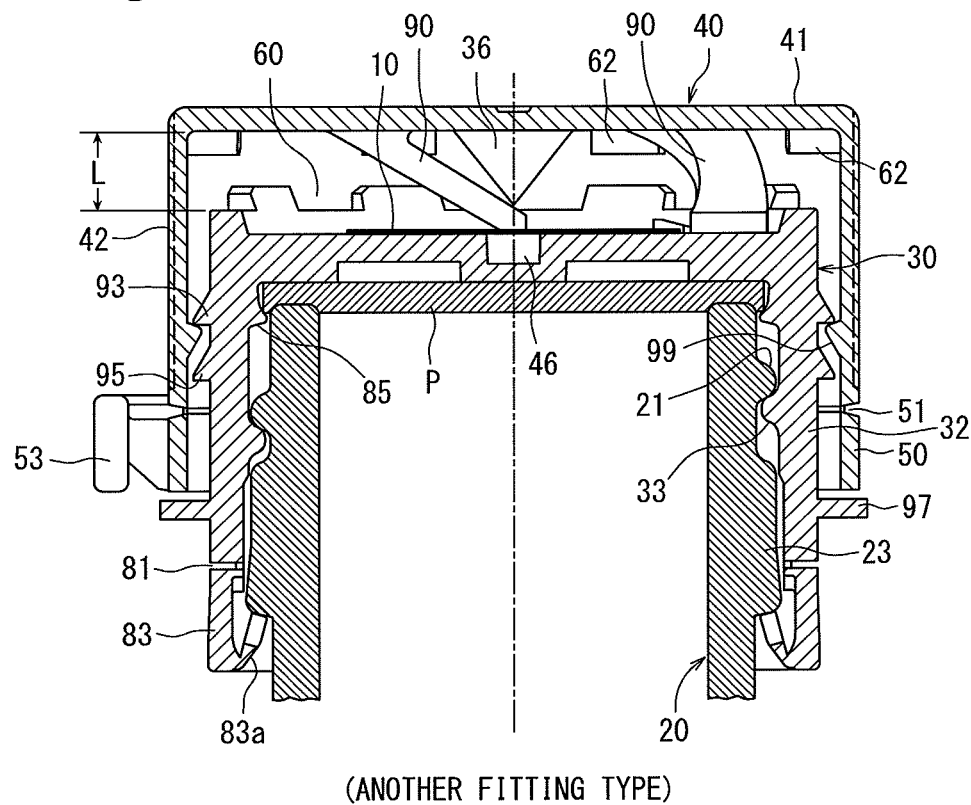
FIG. 17 is a side sectional view of a composite container lid of another fitting type of the present invention.
Figure 18:
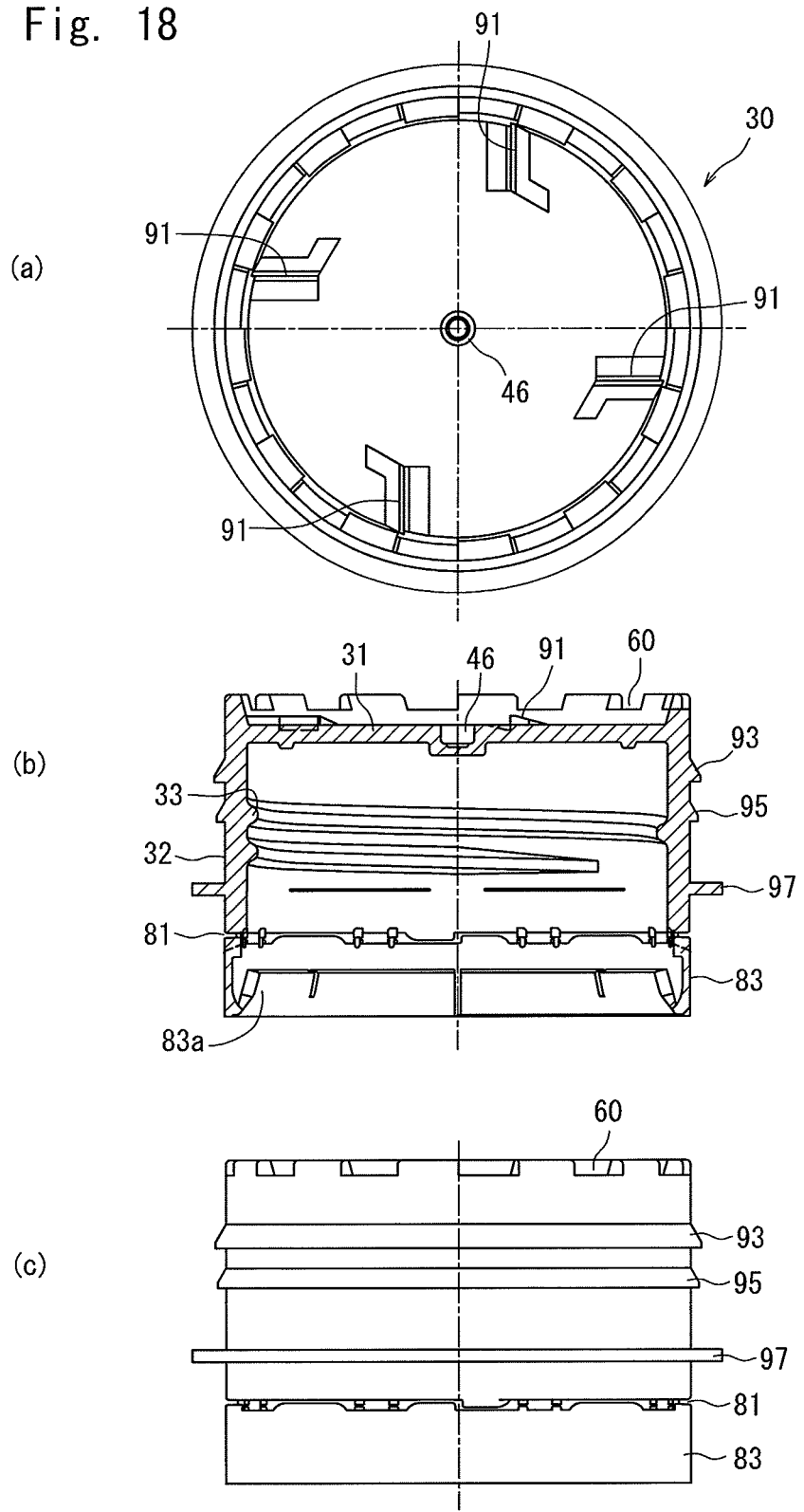
FIG. 18 shows a plan view (a) of an inner cap of the composite container lid of FIG. 17, a side sectional view (b) thereof, and a side view (c) thereof.

In this composite container lid as shown in FIGS. 17 and 18, a thread 33 is formed on the inner surface of the cylindrical wall 32 of the inner cap 30 to come into screw-engagement with the thread 21 on the outer surface of the container mouth portion 20. The inner cap 30 is held on the container mouth portion 20 due to the screw-engagement. Here, a tamper evidence band (TE band) 83 is provided at the lower end of the cylindrical wall 32 via a bridge 81 that can be broken, and a protruding piece 83a formed on the inner surface of the TE band 83 engages with the lower surface of the flange portion 23 formed on the outer surface of the container mouth portion 20 limiting the inner cap 30 from ascending.

Further, the composite container lid of this type is provided with a packing P which is for closing the upper end of the container mouth portion 20, the packing P coming in close contact with the upper end of the container mouth portion being pushed by the lower surface of the top plate 31 of the inner cap 30 thereby to seal the container mouth portion 20.

A small protuberance 85 is formed on the inner surface of the cylindrical wall 32 at an upper part thereof. The small protuberance 85 enables the packing P to be held in the inner cap 30 and, further, makes it possible to remove the inner cap 30 from the container mouth portion 20 and, at the same time, to tear the packing P off from the upper end of the container mouth portion 20.

On the other hand, a cutter 36 is provided on the central portion of the top panel 41 of the over-cap 40, and being corresponded to the cutter 36, a dent 46 is formed in the upper surface of the top plate 31 of the inner cap 30 at the central portion thereof to receive an end portion of the cutter 36. An IC tag 10 is provided so as to cover the dent 46. The cutter 36 breaks a circuit portion (e.g., unsealing detector circuit 9) that connects to the IC chip of the IC tag 10.

Like in the composite container lid of the fitting type mentioned above, fitting notches 60 are formed in the peripheral edge portion on the upper surface of the top plate 31 of the inner cap 30 maintaining a suitable distance, and bumps 62 are formed in the circumferential edge portion on the lower surface of the top panel 41 of the over-cap 40 being corresponded to the notches 60. That is, upon pushing the over-cap 40 down to push the bumps 62 into the notches 62 so as to engage therewith, the inner cap 30 can be turned accompanying the turn of the over-cap 40.

In the over-cap 40 of the above composite container lid, too, a stopper band 50 is coupled to the lower end of the skirt 42 via a bridging portion 51 that can be torn off, and a grip 53 is provided on the outer surface of the band 50 so as to be nipped when it is to be torn off. That is, upon pulling the grip 53 in a circumferential direction, the bridging portion 51 is torn off and the stopper band 50 can be easily torn off from the skirt 42.

Figure 19:
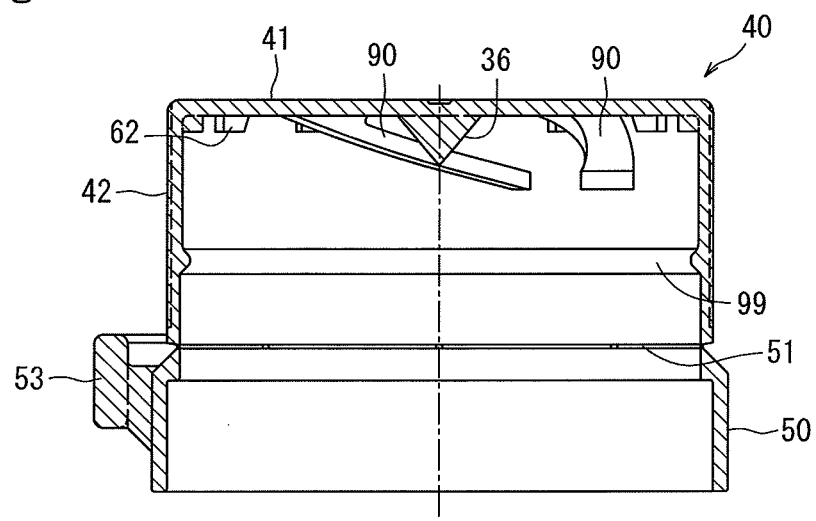
FIG. 19 shows a side view (a) of an over-cap of the composite container lid of FIG. 17 and a side sectional view (b) thereof.
Figure 20:
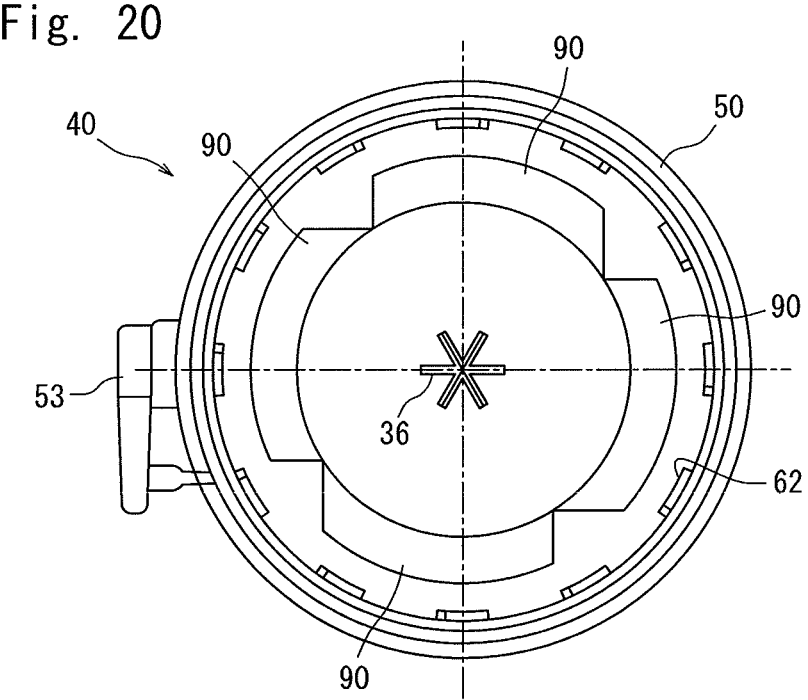
FIG. 20 is a bottom view of the over-cap of FIG. 19.

Here, in the composite container lid of this embodiment as shown, specifically, in FIGS. 17, 19 and 20, resilient strips 90 are provided on the lower surface of the top panel 41 of the over-cap 40. The resilient strips 90 are facing downward from the lower surface of the top panel 41 and facing toward the direction in which the over-cap 40 is sealed, and have their ends press-contacting to the upper surface of the top plate 31 of the inner cap 30. Therefore, the over-cap 40 fitted onto the inner cap 30 is urged upward by the resilient strips 90.

In the example shown, the resilient strips 90 are provided in a number of four (see FIG. 20).

On the upper surface of the top plate 31 of the inner cap 30, further, strip-engaging protuberances 91 are provided being corresponded to the resilient strip 90 to engage with the ends of the resilient strips 90. That is, if the over-cap 40 is turned in the sealing direction, the inner cap 30, too, turns in the sealing direction due to the engagement between the ends of the resilient strips 90 and the strip-engaging protuberances 91.

On the outer surface of the cylindrical side wall 32 of the inner cap 30, there are provided two circumferential protuberances 93 and 95 for positioning maintaining a distance in the up-and-down direction, as well as a positioning rib 97 that comes in contact with the lower end of the stopper band 50 to limit the over-cap 40 from moving downward.

On the inner surface of the skirt 42 of the over-cap 40, on the other hand, there is formed an engaging protuberance 99 that comes in engagement with the lower surfaces of the positioning circumferential protuberances 93, 95.

The composite container lid of this structure is assembled, is mounted onto the container mouth portion 20, and is unsealed as described below.

Referring to FIG. 17, the over-cap 40 is fitted upon being fitted onto the inner cap 30. Upon being fitted, the stopper band 50 of the over-cap 40 descends along the outer surface of the cylindrical side wall 32 of the inner cap 30 whereby the lower end of the stopper band 50 comes in contact with the positioning rib 97 limiting the over-cap 40 from descending any more.

The engaging protuberance 99 of the over-cap 40 is located between the positioning circumferential protuberances 93 and 95 of the inner cap 30.

In a state where the over-cap 40 is fitted onto the inner cap 30, the over-cap 40 is prevented from rattling due to the resilient strips 90 and is, further, urged thereby upward. Therefore, the engaging protuberance 99 engages with the lower surface of the upper positioning circumferential protuberance 93 limiting the over-cap 40 from ascending and, as a result, maintaining a predetermined gap L between the top panel 41 of the over-cap 40 and the top plate of the inner cap 30. In this state, therefore, the IC tag 10 is effectively prevented from being broken by the cutter 46.

After the over-cap 40 is fitted onto the inner cap 30, the inner cap 30 is put on the container mouth portion 20 and the over-cap 40 is turned in the sealing direction so that the inner cap 30 is fitted onto the container mouth portion 20. That is, upon turning the over-cap 40 in the sealing direction, the ends of the resilient strips 90 come in engagement with the strip-engaging protuberances 91, and the inner cap 30, too, turns in the sealing direction together with the over-cap 40.

The operation for unsealing the composite container lid thus fitted onto the container mouth portion 20 is basically the same as that of the case of the above-mentioned composite container lid shown in FIG. 13.

That is, by nipping the grip 53, the stopper band 50 is torn off from the over-cap 40 (skirt 42). The over-cap 40 is now allowed to descend.

Figure 21:
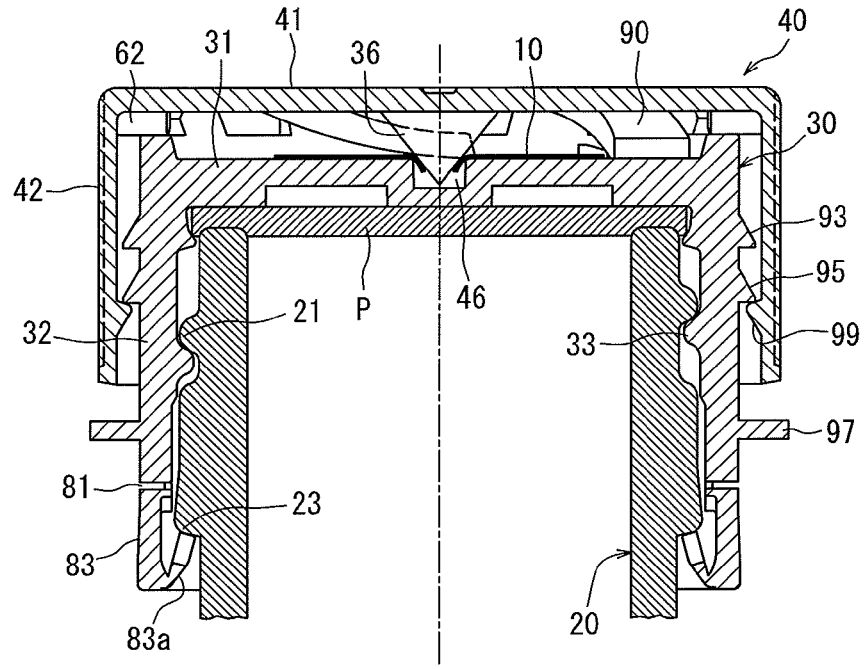
FIG. 21 is a side sectional view of a state where the circuit of the IC tag is broken in the composite container lid of FIG. 17.

In this state, the over-cap 40 is pushed in causing the fitting bumps 62 to be fitted into the fitting notches 60. Here, as shown in FIG. 21, the cutter 36 that descends pierces through the IC tag 10 (circuit such as unsealing detector circuit 9) provided on the top plate 31 of the inner cap 30, and enters into the dent 46.

Further, the engaging protuberance 99 of the over-cap 40 goes beyond the lower positioning circumferential protuberance 95 and moves toward the lower side of the circumferential protuberance 95.

Here, in this embodiment, the over-cap 40 has been urged upward due to the resilient strips 90. As will be understood from FIG. 21, however, the engaging protuberance 99 comes in engagement with the lower surface of the lower circumferential protuberance 95 limiting the over-cap 40 from ascending. That is, though being urged upward by the resilient strips 90, the over-cap 40 is limited from ascending and, therefore, a stable engagement is maintained between the fitting bumps 62 and the fitting notches 60.

Therefore, if the over-cap 40 is turned in the unsealing direction in a state where the IC tag 10 has been broken, the inner cap 30, too, turns in the unsealing direction since the bumps 62 have been engaged with the notches 60. Therefore, the screw-engagement is released between the inner cap 30 and the container mouth portion 20, and the inner cap 30 is removed from the container mouth portion 20 in such a form that the over-cap 40 has been fitted thereon.

In the composite container lid of this embodiment, too, the fact of unsealing can be recognized relying on the breakage of the IC tag 10 (circuit such as unsealing detector circuit 9).

Further, the inner cap 30 removed from the container mouth portion 20 can be used for resealing with the over-cap 40 being fitted thereon or without the over-cap 40.

In the composite container lid of the above embodiment, further, there is no specific limitation on the number of the resilient strips 90, and the number thereof may be one. From such a standpoint that the resilient force of the resilient strips 90 is evenly applied to the over-cap 40, however, it is desired that the resilient strips 90 are provided in a number of 2 to 4 and, specifically, 3 or 4.

Figure 22:
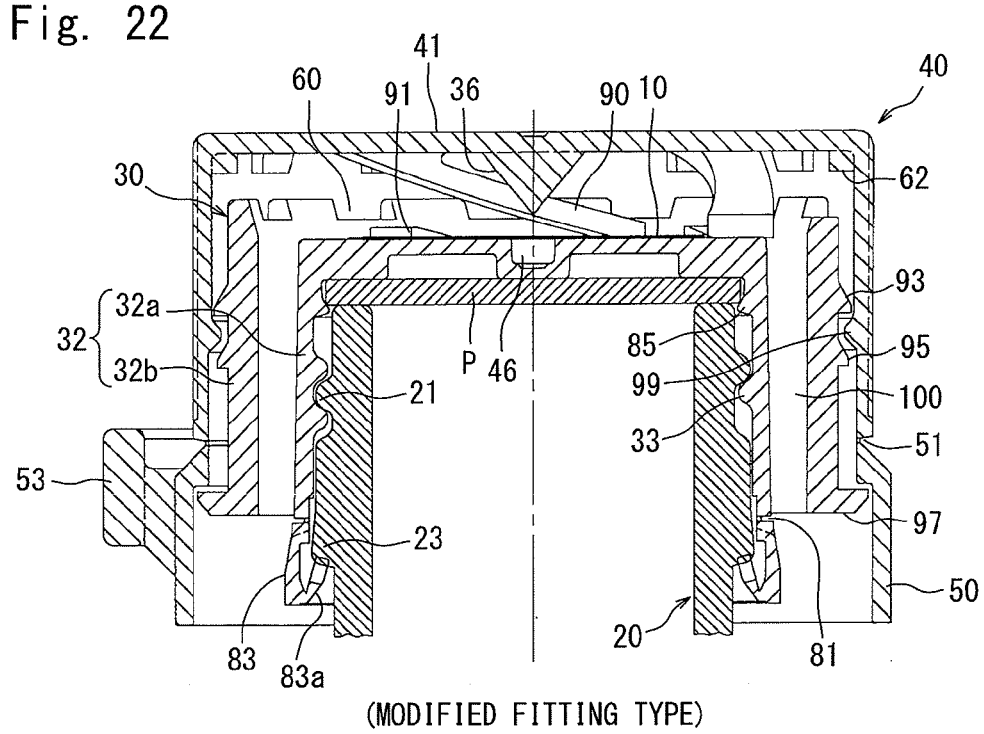
FIG. 22 is a side sectional view showing a modified composite container lid of the fitting type of FIG. 17.

The above composite container lid may, further, assume the structure as shown in FIG. 22.

That is, the composite container lid of the fitting type of FIG. 21 is the same as the composite container lid of FIG. 17 except that the cylindrical side wall 32 of the inner cap 30 is divided, by a slit 100 extending from the upper side, into an inner side wall 32a and an outer side wall 32b, the lower end of the outer side 32b protruding outward to form a positioning rib 97, and the step 45 formed on the inner surface of the stopper band 50 coming in engagement with the positioning rib 97 to limit the over-cap 40 from descending.

In FIG. 22, the lower end of the outer side wall 32b is coupled to the inner side wall 32a at a portion that is not shown. Namely, the slit 100 is not penetrating up and down through the coupling portion and is terminating near the lower end.

In the composite container lid of FIG. 22, a TE band 83 is provided at the lower end of the inner side wall 32a of the cylindrical side wall 32, and the stopper band 50 of the over-cap 40 is so formed as to cover the TE band 83. Therefore, the stopper band 50 protects the TE band 83 effectively preventing such an unauthorized unsealing that the composite container lid is removed from the container mouth portion 20 by inserting a tool such as screw driver from the lower end of the TE band 83 and, further, improving the function for guaranteeing the quality of the content.

The composite container lid can be assembled and fitted onto the container mouth portion 20 or can be removed therefrom in quite the same manner as that of the case of the composite container lid of FIG. 17.

<Composite Container Lid of the Antenna Breaking Type>

In the composite container lids of the invention mentioned above, the cutter 36 is provided on the inner cap 30 or on the over-cap 40 at the center thereof except the composite container lid of the ratchet type. The cutter 36, however, can also be provided at a position deviated from the center. The composite container lid of the type in which the cutter is arranged at a position deviated from the center is specifically desired for breaking the antenna 5 of the IC tag 10 of the form shown in FIG. 2.

The structure of the inner cap 30 of the composite container lid of the antenna breaking type is shown in FIGS. 23(a) and (b), and the structure of the over-cap 40 is shown in FIGS. 24(a) and (b).

Figure 23:
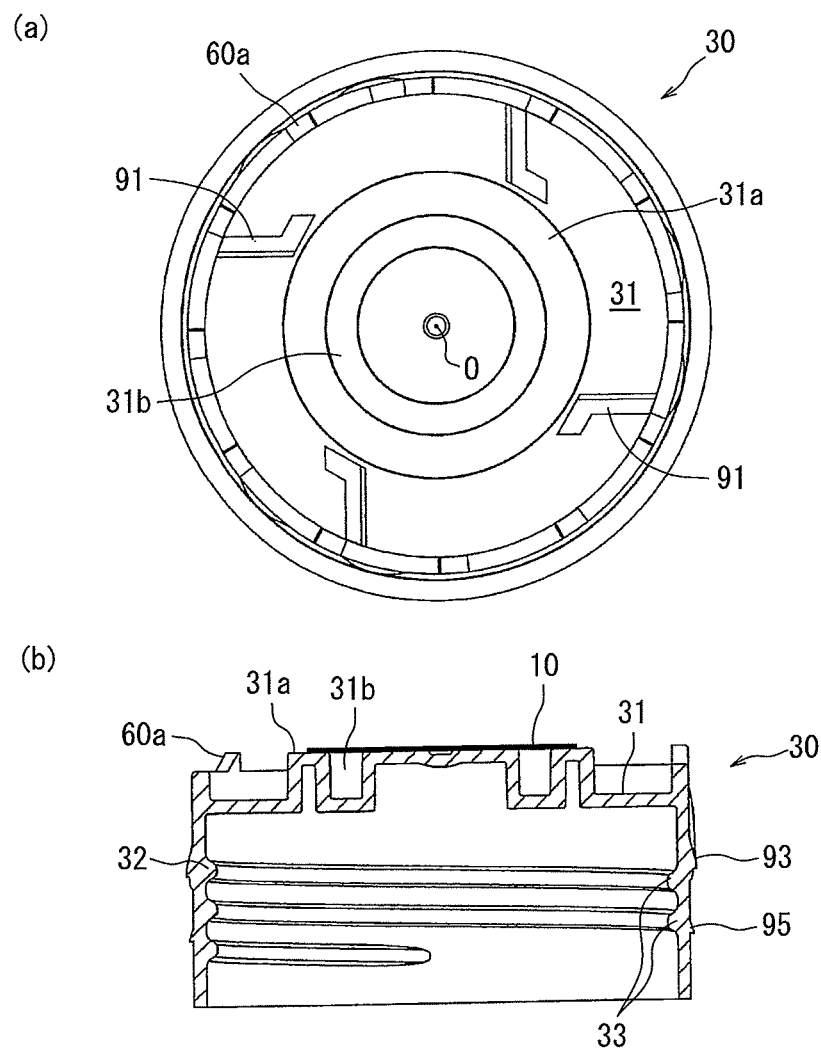
FIG. 23 shows a plan view (a) of an inner cap used in a further modified composite container lid of the present invention and a side sectional view (b) thereof.

In FIG. 23, a protruded central portion 31a is formed on the upper surface of the top plate 31 of the inner cap 30 used for the composite container lid, an annular dent 31b is formed in the central portion 31a so as to surround the center O, and the IC tag 10 is attached so as to cover the annular dent 31b. That is, the annular dent 31b corresponds to the dent 46 that receives the cutter 36 in the composite container lids of various types mentioned above.

Referring to FIG. 24, further, a plurality of cutters 36 (four in FIG. 24) are formed on the lower surface of the top panel 41 of the over-cap 40 used for the composite container lid in a manner to surround the center O. The positions of the cutters 36 are corresponding to the annular dent 31b.

In a state where the over-cap 40 is fitted onto the inner cap 30, the cutters 36 are all positioned over the annular dent 31b. If the over-cap 40 descends, therefore, the cutters 36 all pierce through the IC tag 10 and the ends of the cutters 36 are received in the annular dent 31b.

As will be understood from the above description, upon attaching the IC tag 10 of the form shown in, for example, FIG. 2 onto the central portion 31a formed on the upper surface of the top plate 31, the arcuate multiplicity of line portions Y forming the antenna 5 of the IC tag 10 are broken by the cutters 36. In FIG. 2, the breaking portion is represented by an arrow X.

Figure 25:
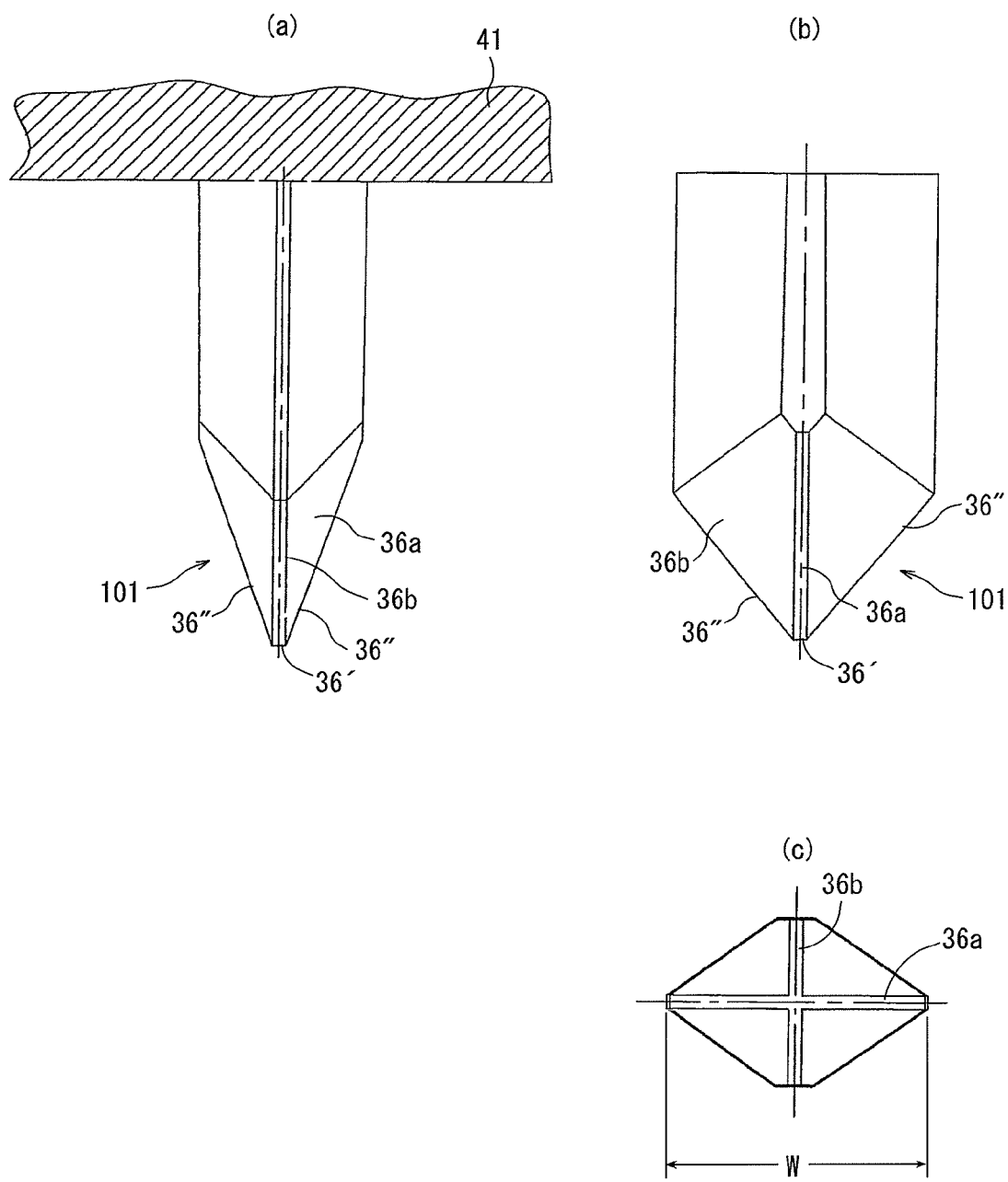
FIG. 25 shows a right side view (a) illustrating, on an enlarged scale, a cutter provided for the over-cap of FIG. 24, a left side view (b) thereof and a bottom view (c) thereof.
Figure 26:
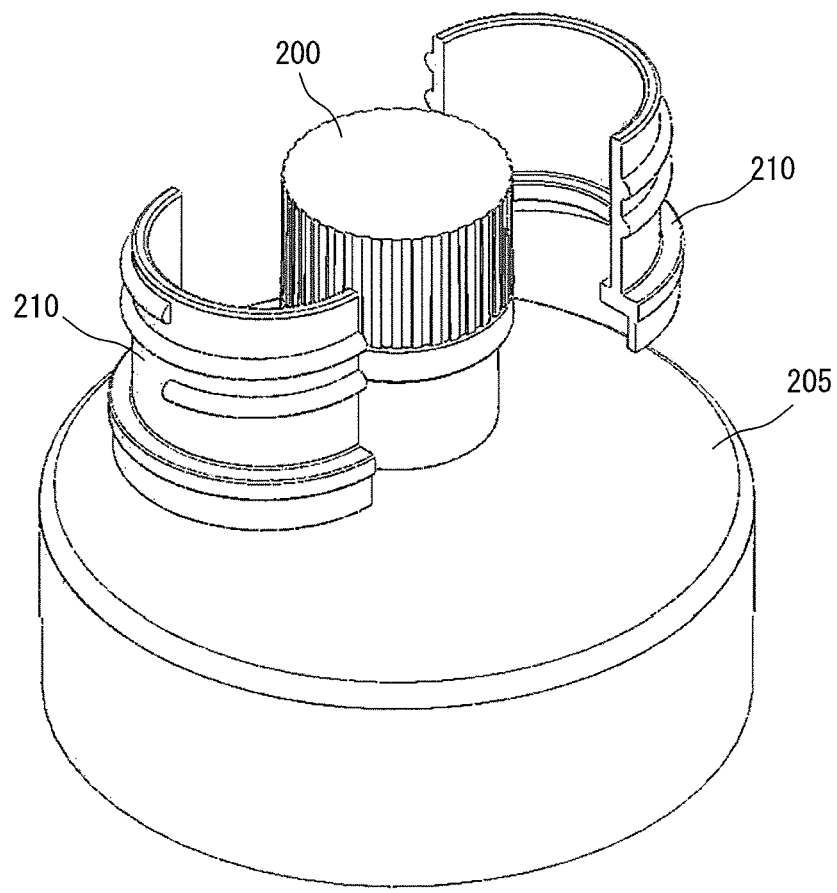
FIG. 26 is a view illustrating a method of applying the composite container lid of the present invention to an existing packing container.

In breaking the multiplicity of line portions Y, it is desired that, as shown in FIG. 25, right drawing (A) and left drawing (B), the ends (lower ends) 101 of the cutters 36 that are used have the shape of a sharp blade (thin plate-like shape with the end as the vertex) at their ends 36' and edges 36" and, specifically, that as shown in FIG. 26, bottom drawing (C), have the shape consisting of two pieces of blades 36a and 36b crossing each other. Namely, with the cutters 36 having a conical shape, the ends 36' thereof may simply push and widen the arcuate lines 5a, 5a when they are supposed to pierce through between the arcuate lines 5a and 5a forming the multiplicity of line portions Y of the IC tag 10 of FIG. 2 to break them without, however, really breaking the lines 5a, 5a. By using the cutters 36 having the shape of sharp blades at their ends 36' and edges 36'', on the other hand, it is made possible to reliably cut the arcuate lines 5a forming the multiplicity of line portions Y.

In the cutters 36 of the above-mentioned form, further, it is desired that either one of the blades 36a, 36b at the end is facing in the direction (i.e., in the radial direction of the arcuate line 5a) at right angles with the tangential line of the arcuate line 5a and, further, that a maximum width w of the blade 36a or 36b at the end thereof (see FIG. 25 (C)) is larger than a gap d between the arcuate lines 5a and 5a and, specifically, satisfies the conditions of the following formula if the arcuate lines 5a are part of a circle, $$w > d + 2t$$

wherein t is a thickness of the lines 5a.

Further, if the arcuate lines 5a are a part of an ellipse, it is most desired that the above two pieces of blades 36a and 36b are intersecting each other at right angles, and their respective maximum widths w satisfy the following formula, $$w > (d+2d)/\cos 45° = 2^{1/2} \cdot (d+2d)$$

That is, upon setting the maximum width w as described above, the lines 5a can be reliably broken irrespective of the positions of the multiplicity of line portions Y pierced through by the ends 36' of the cutters 36.

Though the cutters 36 were provided in a number of four in the above embodiment, the number should be at least two or more and, specifically, three or more so that the multiplicity of line portions Y of the antenna 5 can be reliably broken.

In FIG. 24, further, the plurality of cutters 36 are arranged along a circle with the center O of the over-cap 40 as a center. It is, however, also allowable to arrange a plurality of cutters 36 at positions away from the center O by dissimilar distances.

Reverting to FIGS. 23 and 24, in the composite container lid, the inner surface of the cylindrical wall 32 of the inner cap 30 is threaded as designated at 33 to engage with the thread of the container mouth portion like that of the above-mentioned composite container lids of FIGS. 17 to 22, and its outer surface is forming circumferential protuberances 93 and 95 for positioning maintaining a distance in the up-and-down direction. Further, an engaging protuberance 99 is formed on the outer surface of the skirt 42 of the over-cap 40.

A plurality (four) of resilient strips 90 are formed on the lower surface of the top panel 41 of the over-cap 40, while on the upper surface of the top plate 31 of the inner cap 30 are formed engaging protuberances 91 that come into engagement with the ends of the resilient strips 90 to block the turn of the resilient strips 90 (over-cap 40) relative to the inner cap 30. Namely, if the over-cap 40 is turned in the sealing direction, the inner cap 30, too, turns in the sealing direction due to the engagement of the ends of the resilient strips 90 with the engaging protuberances 91.

Unlike those of the composite container lids of various embodiments mentioned above, further, protuberances 60a are formed maintaining a suitable distance along the whole circumference of the edge portion on the upper surface of the top plate 31 of the inner cap 30 to engage with the over-cap 40, while protuberances 62a are formed on the circumferential edge portion of the top panel 41 of the over-cap 40 to engage with the above protuberances 60a.

As will be understood from FIGS. 23 and 24, the protuberances 60a of the inner cap 30 have such a triangular shape that a surface is erected on the side in the sealing direction and a surface tilted on the side in the unsealing direction, while the protuberances 62a of the over-cap 40 have such a triangular shape that a surface is erected on the side in the unsealing direction and a surface is tilted on the side in the sealing direction. Upon turning the over-cap 40 in the unsealing direction with the erected surfaces of the protuberances 60a, 62b being in engagement, the inner cap 30 can be turned in the unsealing direction.

That is, due to the resilient strips 90, the over-cap 40 is stably held on the inner cap 30 without rattling. Here, since the over-cap 40 has been urged upward at all times, a gap is maintained between the top panel 41 of the over-cap 40 and the top plate of the inner cap 30 to such a degree that the IC tag 10 is not broken by the cutters 46. Further, if the over-cap 40 is not pushed in to bring the protuberances 60a and 62a into engagement with each other, then the inner cap 30 cannot be turned in the unsealing direction to thereby exhibit child resistance.

Further, in this state as is obvious from the bottom view (b) of FIG. 24, the protuberances 62a are formed along the circumferential edge portion of the top panel 41 of the over-cap 40 not over the whole circumference of the edge portion but over half the circumference thereof. Therefore, when the over-cap 40 is fitted being fitted onto the inner cap 30, a half of the circumferential edge portion (where no protuberance 62a has been formed) of the top panel 41 of the over-cap 40 comes into direct contact with the protuberances 60a. Therefore, the over-cap 40 is tilted and, as a result, the engaging protuberance 99 on the inner surface of the skirt 42 of the over-cap 40 moves smoothly passing beyond the circumferential protuberance 93 on the outer surface of the cylindrical wall 32 of the inner cap 30, and is located between the circumferential protuberance 93 of the upper side and the circumferential protuberance 95 of the lower side.

Therefore, the over-cap 40 thus fitted onto the inner cap 30 is prevented from ascending due to the engagement of the engaging protuberance 99 with the circumferential protuberance 93 of the upper side, and is not allowed to escape from the inner cap 30.

Therefore, if the inner cap 30 fitted with the over-cap 40 is fitted onto the container mouth portion 20 (not shown in FIG. 23 or 24) and if the over-cap 40 is turned in the sealing direction, then the inner cap 30, too, turns in the sealing direction together with the over-cap 40 due to the engagement of the resilient strips 90 with the engaging protuberances 91. Therefore, though the inner cap 30 is fitted onto the container mouth portion 50, the over-cap 40 is limited from descending due to the engagement of the engaging protuberances 55 with the support ring 25.

Further, as shown in the side sectional view of FIG. 24, a stopper band 50 having a nip 53 is provided at the lower end of the skirt 42 of the over-cap 40 via a bridging portion 51 that can be broken, and an engaging protuberance 55 is formed on the inner surface of the band 50. Namely, the engaging protuberance 55 engages with the upper surface of the support ring 25 of the container mouth portion 20, and is blocked from moving down.

To unseal the composite container lid, first, the grip 53 is nipped and is pulled to separate the stopper band 50 away enabling the over-cap 40 to descend. Thereafter, the over-cap 40 may be pushed in and turned in the unsealing direction. Namely, upon descending the over-cap 40, the protuberances 60a and 62a come into engagement with each other whereby the inner cap 30 turns in the unsealing direction and ascends. Here, however, the over-cap 40 is prevented from ascending due to the engagement of the circumferential protuberance 95 on the lower side with the engaging protuberance 99. Therefore, the inner cap 30 only ascends, and the antenna 5 of the IC tag 10 is broken by the cutters 36. As the over-cap 40 is, further, turned, the inner cap 30 is removed from the container mouth portion 20, the inner cap 30 mounting thereon the over-cap 40 from which the stopper band 50 has been separated away.

In the composite container lid of the antenna breaking type as described above, the over-cap 40 is pushed in and is turned in the unsealing direction, whereby the antenna 5 of the IC tag 10 is effectively broken and, thereafter, the inner cap 30 is removed from the container mouth portion 20. Therefore, if the container mouth portion 20 is once unsealed, information stored in the IC chip 3 can no longer be read out and from which it is allowed to know the fact of unsealing. Moreover, the stripper band 50 of the over-cap 40 that has been separated away makes it possible to learn the fact of unsealing contributing greatly to improving the function for proving the history of unsealing.

The composite container lid of the antenna breaking type, too, can be designed in various ways. For example, instead of the IC tag 10 and the protuberances 60a, 62a, there can be employed a fitting structure provided with bumps and dents for fitting, a polyhedrally engaging structure provided with a polyhedral portion 43, and an inversely threaded structure in which the over-cap 40 is fitted onto the inner cap 30 via inverse threads.

In the composite container lids of the above-mentioned various types of the present invention, the IC tag 10 is attached to the over-cap 40 or the inner cap 30; i.e., the IC tag 10 is not attached spanning across different members or is not attached to the band portion that will be cut away at the time of unsealing. This facilitates the operation for attaching the IC tag 10, facilitates the operation for fitting the inner cap 30 and the over-cap 40 and, besides, effectively prevents the IC tag from being broken during these operations.

Further, the inner cap 30 sealing the container mouth portion 20 is unsealed being linked to the operation of unsealing the over-cap 40; i.e., no extra operation is needed for unsealing the container mouth portion.

The above-mentioned composite container lids of the invention can, further, be effectively applied to the existing packing containers to which a cap has been fitted already.

Referring, for example, to FIG. 26, split molds 210 and 210 having outer surfaces corresponding to the above-mentioned container mouth portion 20 are fitted onto the nozzle portion of an existing packing container 205 which has been filled with the content and to which a cap 200 has been fitted. In this state, the inner cap 30 and the over-cap 40 of any of the above-mentioned types are provided enabling the composite container lid of the invention to be applied to the existing packing container 205.

In this case, the inner cap 30 and the over-cap 40 are removed in a manner as described above, the split molds 210 and 210 are removed and, further, the cap 200 is removed in a customary manner to take out the content from the container.

The inner cap 30 and the over-cap 40 of any of the above various types can be produced by compression-forming or injection-forming a thermoplastic resin which may be an olefin resin such as polyethylene, polypropylene, ethylene-propylene copolymer, polybutene-1, ethylene-butene-1 copolymer, propylene-butene-1 copolymer or ethylene-vinyl acetate copolymer; or polystyrene, styrene-butadiene copolymer, ABS resin or polycarbonate.

DESCRIPTION OF REFERENCE NUMERALS

3: IC chip
5: antenna
Y: arcuate multiplicity of line portions
9: unsealing detector circuit
10: IC tag
20: container mouth portion
30: inner cap
36: protuberance (cutter)
40: over-cap

The invention claimed is:

1. A composite container lid which comprises an inner cap fitted onto the container mouth portion by screw engagement, an over-cap fitted onto the inner cap, and an IC tag; wherein
said over-cap has a top panel and a skirt descending from the circumferential edge of the top panel;
said inner cap has a top plate and a cylindrical wall descending from the circumferential edge of the top plate and having a thread formed in the inner surface thereof to come into screw engagement with the outer surface of the container mouth portion;
an engaging means is provided between the inner surface of the skirt of said over-cap and the outer surface of the cylindrical wall of said inner cap to transmit the turn of the over-cap fitted onto said inner cap to said inner cap; and
said IC tag is attached to said inner cap or to said over-cap in a manner that a circuit inclusive of an information transmission/reception antenna connected to an IC chip in said IC tag is broken by a motion of said over-cap relative to said inner cap caused at the time of unsealing said inner cap fitted onto the container mouth portion.

2. The composite container lid according to claim 1, wherein:
a gap is maintained between the upper surface of the top plate of said inner cap and the lower surface of the top panel of said over-cap fitted onto said inner cap;
said IC tag is attached to either the lower surface of the top panel of said over-cap or to the upper surface of the top plate of said inner cap; and
a cutter is formed on said inner cap or on said over-cap to break the circuit of said IC tag.

3. The composite container lid according to claim 2, wherein a stopper band is formed at the lower end of the skirt of said over-cap to limit said over-cap from ascending or descending when said inner cap is fitted onto the container mouth portion.

4. The composite container lid according to claim 3, wherein said stopper band is provided so as to be separated away from the skirt of said over-cap.

5. The composite container lid according to claim 4, wherein the outer surface of the cylindrical wall of said inner cap and the inner surface of the skirt of said over-cap are, respectively, threaded so as to be screw-engaged with each other, the threads serving as said engaging means to transmit the turn of said over-cap to said inner cap, the screw engagement between the outer surface of the cylindrical wall and the inner surface of the skirt being in an inversely threaded relationship relative to the screw engagement between the inner surface of the cylindrical wall of said inner cap and the outer surface of the container mouth portion, wherein after said stopper band is separated away, said circuit of said IC tag is broken by said cutter that descends accompanying the turn of said over-cap, and said inner cap turns in a direction in which it is unsealed as said over-cap continues to be turned.

6. The composite container lid according to claim 5, wherein said IC tag is attached to said inner cap or said over-cap so as to cover the dent formed in the upper surface of the top plate of said inner cap or the dent formed in the lower surface of the top panel of said over-cap, and the end of said cutter that has broken the circuit of said IC tag is received by said dent.

7. The composite container lid according to claim 4, wherein a cutting pawl is formed on the inner surface of the skirt of said over-cap, a vertical groove and a ratchet groove with an end are formed in the outer surface of the cylindrical wall of said inner cap, said vertical groove stretching in the vertical direction and said ratchet groove with an end stretching from the lower end of said vertical groove in the circumferential direction which is the unsealing direction, and said IC tag is so provided as to at least cover said ratchet groove;

said cutting pawl and the circumferential end portion of said ratchet groove work as said engaging means to transmit the turn of said over-cap to said inner cap and, at the same time, said cutting pawl also works as said cutter; and in a state where said stopper band is present, said cutting pawl is in engagement with said vertical groove to suppress the turn of said over-cap and in a state where said stopper band is separated away, said cutting pawl descends through said vertical groove to engage with said ratchet groove permitting said over-cap to be turned in a direction in which it is unsealed, and when said over-cap is turned in the direction in which it is unsealed, said cutting pawl moves through said ratchet groove in the unsealing direction to break the circuit of said IC tag that is so provided as to cover said ratchet groove, and as said over-cap is further turned in the unsealing direction, said cutting pawl comes in contact with the circumferential end portion of said ratchet groove causing said inner cap to be turned in the unsealing direction.

8. The composite container lid according to claim 4, wherein downwardly protruding bumps are formed at the circumferential edge portion on the lower surface of the top panel of said over-cap, dents are formed in the circumferential edge portion on the upper surface of the top plate of said inner cap so as to be fitted with the bumps, said bumps and said dents working as said engaging means to transmit the turn of said over-cap to said inner cap, wherein when said over-cap is pushed in by separating said stopper band away, said circuit of said IC tag is broken by said cutter and, at the same time, said bumps enter in said dents and engage therewith permitting said inner cap to be turned by said over-cap in the unsealing direction.

9. The composite container lid according to claim 8, wherein said IC tag is attached to said inner cap or said over-cap so as to cover the dent formed in the upper surface of the top plate of said inner cap or the dent formed in the lower surface of the top panel of said over-cap, and the ends of said cutter that has broken the circuit of said IC tag is received by said dent.

10. The composite container lid according to claim 9, wherein said IC tag is attached to said over-cap so as to cover the dent formed in the lower surface of the top panel of said over-cap, said cuter is formed on the upper surface of the top plate of said inner cap, resilient strips are formed on the lower surface of the top panel of said over-cap to limit the over-cap from descending upon coming in contact with the upper surface of the top plate of said inner cap, and stopper protuberances are formed on the upper surface of the top plate of said inner cap to block the movement of said resilient strips in the sealing direction relative to said inner cap.

11. The composite container lid according to claim 10, wherein two circumferential protuberances are formed on the outer surface of the cylindrical wall of said inner cap maintaining a distance in the up-and-down direction, an engaging protuberance is formed on the inner surface of the skirt of said over-cap to engage with said circumferential protuberances, wherein in a state where said stopper band has not been separated away, said engaging protuberance is positioned between the two circumferential protuberances, and as said engaging protuberance comes into engagement with the circumferential protuberance of the upper side, said over-cap is limited from ascending relative to said inner cap and in a state where said stopper band is separated away and said over-cap is pushed down, said engaging protuberance is positioned under the circumferential protuberance of the lower side, said and over-cap is limited from ascending relative to said inner cap due to the engagement of said engaging protuberance with the circumferential protuberance of the lower side.

12. The composite container lid according to claim 2, wherein said stopper band is positioned under the lower end of the cylindrical side wall of said inner cap, and said stopper band comes into engagement with the outer surface of the container mouth portion when said inner cap is fitted onto the container mouth portion to limit said over-cap from ascending and/or descending.

13. The composite container lid according to claim 12, wherein polyhedral portions are formed on the outer surface of the cylindrical wall of said inner cap and on the inner surface of the skirt of said over-cap so as to face each other and come in contact with each other, the polyhedral portions working as the engaging means to transmit the turn of said over-cap to said inner cap, wherein when said over-cap is turned in a direction in which said inner cap is unsealed, said over-cap is suppressed from ascending due to the stopper band while said inner cap is allowed to ascend by being turned in a direction in which it is unsealed, whereby the circuit of said IC tag is broken by said cutter, and the engagement is released between the stopper band and the outer surface of the container mouth portion after said circuit has been broken.

14. The composite container lid according to claim 13, wherein said IC tag is attached to said inner cap or said over-cap so as to cover a dent formed in the upper surface of the top plate of said inner cap or a dent formed in the lower surface of a top panel of said over-cap, and the ends of said cutter that has broken the circuit of said IC tag is received by said dent.

15. The composite container lid according to claim 2, wherein said IC tag is attached to said inner cap so as to cover an annular dent formed in the upper surface of the top plate of said inner cap, said cutters are formed in a plural number at portions maintaining a suitable distance from each other on the upper surface of the top plate of said inner cap away from the center thereof, the information transmission/reception antenna of said IC tag is broken by these cutters, and the ends of said cutters after having broken the antenna of said IC tag are received by said annular dent.

16. The composite container lid according to claim 15, wherein said information transmission/reception antenna includes a multiplicity of line portions where a plurality of arcuate lines are extending maintaining a predetermined gap, and at least parts of said plurality of arcuate lines are broken by said cutters.

17. The composite container lid according to claim 16, wherein said cutters have the shape of blade with sharp end.

18. The composite container lid according to claim 17, wherein if a gap between the neighboring arcuate lines is d in said multiplicity of line portions, a maximum width w of the blade shape of said cutters is at least larger than the gap d between said arcuate lines d, said cutters are so arranged that the shape of the pyramidal blade intersects the tangential direction of said arcuate lines at right angles, and said cutters descend in this state to break at least parts of said plurality of arcuate lines.

19. The composite container lid according to claim 1, wherein to the IC chip of said IC tag 10, there are connected a circuit connected to an information transmission/reception antenna and an unsealing detector circuit, and the unsealing detector circuit is selectively broken when said inner cap is unsealed.

\* \* \* \* \*